United States Patent
Hattori et al.

(10) Patent No.: US 8,386,151 B2
(45) Date of Patent: Feb. 26, 2013

(54) CONTROL UNIT AND CONTROL METHOD FOR VARIABLE VALVE TIMING MECHANISM, PROGRAM FOR IMPLEMENTING THE CONTROL METHOD, AND RECORDING MEDIUM ON WHICH THE PROGRAM IS RECORDED

(75) Inventors: Masayoshi Hattori, Toyota (JP); Tsukasa Abe, Gotenba (JP); Eiichi Hioka, Toyota (JP); Daigo Ando, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 660 days.

(21) Appl. No.: 12/595,326

(22) PCT Filed: Apr. 9, 2008

(86) PCT No.: PCT/IB2008/000865
§ 371 (c)(1),
(2), (4) Date: Dec. 17, 2009

(87) PCT Pub. No.: WO2008/122881
PCT Pub. Date: Oct. 16, 2008

(65) Prior Publication Data
US 2010/0106355 A1    Apr. 29, 2010

(30) Foreign Application Priority Data

Apr. 10, 2007  (JP) ................................ 2007-102997
Apr. 17, 2007  (JP) ................................ 2007-108301

(51) Int. Cl.
*F01L 1/34*    (2006.01)
*F02D 13/02*   (2006.01)

(52) U.S. Cl. ...................... 701/105; 701/112; 123/90.15
(58) Field of Classification Search .................. None
See application file for complete search history.

(56) References Cited

U.S. PATENT DOCUMENTS

| | | | |
|---|---|---|---|
| 5,611,304 A | 3/1997 | Shinojima | |
| 6,196,173 B1 * | 3/2001 | Takahashi et al. | 123/90.15 |
| 8,020,527 B2 * | 9/2011 | Mashiki et al. | 123/90.15 |
| 8,165,785 B2 * | 4/2012 | Mashiki et al. | 701/105 |
| 2001/0004883 A1 | 6/2001 | Tachibana et al. | |
| 2002/0100442 A1 | 8/2002 | Takahashi et al. | |
| 2007/0175427 A1 | 8/2007 | Inoue et al. | |

FOREIGN PATENT DOCUMENTS

| | | |
|---|---|---|
| GB | 2 385 889 | 9/2003 |
| JP | 07-233713 A | 9/1995 |

(Continued)

OTHER PUBLICATIONS

Office Action issued Aug. 2, 2011 in Japanese Patent Application 2009-209375 filed Sep. 17, 2009 (with English Translation).

*Primary Examiner* — Michael J. Zanelli
(74) *Attorney, Agent, or Firm* — Oblon, Spivak, McClelland, Maier & Neustadt, L.L.P.

(57) ABSTRACT

An ECU executes a program based on which, when a fuel-supply cutoff control is executed or when a hybrid vehicle travels in a second mode in which the engine is stopped and the hybrid vehicle travels using only the drive power generated by a second MG an intake VVT mechanism is controlled so that a valve phase is brought to the mechanically determined most retarded phase. The phase, which is detected by a cam position sensor, is learned as the most retarded phase.

24 Claims, 12 Drawing Sheets

FOREIGN PATENT DOCUMENTS

| | | |
|---|---|---|
| JP | 2000-328969 | 11/2000 |
| JP | 2001 82190 | 3/2001 |
| JP | 2001-263117 | 9/2001 |
| JP | 2002-180856 | 6/2002 |
| JP | 2003 184585 | 7/2003 |
| JP | 2004 156461 | 6/2004 |
| JP | 2005-307935 | 11/2005 |
| JP | 2006-299812 A | 11/2006 |
| WO | WO2007/122876 A1 * | 11/2007 |

* cited by examiner

CONTROL UNIT AND CONTROL METHOD FOR VARIABLE VALVE TIMING MECHANISM, PROGRAM FOR IMPLEMENTING THE CONTROL METHOD, AND RECORDING MEDIUM ON WHICH THE PROGRAM IS RECORDED

BACKGROUND OF THE INVENTION

1. Field of the Invention

The invention relates generally to a control unit and control method for a variable valve timing mechanism, a program for implementing the control method, and a recording medium on which the program is recorded. More specifically, the invention relates to a technology for learning the phase of a valve, which is detected by a valve phase detector, in an internal combustion engine in which the phase of at least one of an intake valve and an exhaust valve is variable.

2. Description of the Related Art

A variable valve timing (VVT) mechanism that changes the phase (i.e., crank angle), at which an intake valve or an exhaust valve is opened/closed, based on the engine operating state has been used. Such variable valve timing mechanism changes the phase of the intake valve or the exhaust valve by rotating a camshaft, which opens/closes the intake valve or the exhaust valve, relative to, for example, a sprocket. The camshaft is rotated hydraulically or by means of an actuator, for example, an electric motor.

The range in which the phase is allowed to change may change due to, for example, slack in a chain that connects a crankshaft to the camshaft. Therefore, the phase of the mechanically determined most retarded angle and the phase of the mechanically determined most advanced angle change due to temporal change of an internal combustion engine. In this case, for example, the value output from a cam position sensor, which is stored as an output value corresponding to the phase of the most retarded angle, may differ from the value corresponding to the phase of the actual most retarded angle. Accordingly, it is necessary to periodically learn the phase that is detected by the cam position sensor at the phase of the mechanically determined most retarded angle.

Japanese Patent Application Publication No. 2001-82190 (JP-A-2001-82190) describes a valve timing control apparatus. If a learned value of a deviation from the reference position for a variable valve timing mechanism is cleared, the valve timing control apparatus promptly executes learning for the reference position. The valve timing control apparatus described in JP-A-2001-82190 learns the deviation of the actual valve timing, calculated based on a crank angle and a cam position, from the valve timing corresponding to the reference position for the variable valve timing mechanism, and corrects the actual valve timing. The valve timing control apparatus then controls the variable valve timing mechanism so that the corrected actual valve timing matches a target valve timing that is set based on the engine operating state. The valve timing control apparatus includes a forcibly learning unit that forces the valve timing control apparatus to execute learning using the position corresponding to the target valve timing as the reference position for the variable valve timing mechanism during a set period after an engine is started, when the learned value used to learn the deviation of the actual valve timing from the valve timing corresponding to the reference position for the variable valve timing mechanism is cleared.

With the valve timing control apparatus described in JP-A-2001-82190, when the learned value used to learn the deviation of the actual valve timing, which is calculated based on the crank angle and the cam position, from the valve timing corresponding to the reference position for the variable valve timing mechanism is cleared, learning is forcibly executed using the position corresponding to the target valve timing as the reference position for the variable valve timing mechanism during the set period after the engine is started. Thus, it is possible to promptly learn the deviation of the actual valve timing from the valve timing corresponding to the reference position and reflect the deviation on the valve timing control. Therefore, it is possible to execute the control accurately, thereby eliciting sufficiently high engine output performance.

In order to reduce vibration, that is likely to occur when the engine is being started, the compression ratio at the time of cranking may be reduced by greatly retarding the phase of the intake valve when the engine is being started. In an internal combustion engine in which the phase is controlled in this way, the phase that should be used as the reference phase, for example, the phase of the most retarded angle of the valve is not appropriate as the phase used during an operation of the engine. In this internal combustion engine, if the phase is learned after the internal combustion engine is started, that is, when the internal combustion engine is operating, as described in JP-A-2001-82190, the phase of the valve may be retarded more than necessary. In this case, for example, exhaust emission may deteriorate.

Japanese Patent Application Publication No. 2004-156461 (JP-A-2004-156461) describes a variable valve timing control apparatus that includes a reference position learning unit that learns a reference position for the valve timing before an internal combustion engine is started, and an engine start control prohibition unit that prohibits execution of a start control for the internal combustion engine until learning of the reference position is completed.

With the variable valve timing control apparatus according to JP-A-2004-156461, it is possible to accurately detect the actual valve timing from the beginning of the start of the internal combustion engine, and to reliably control the actual valve timing to a target valve timing that is suitable for starting the internal combustion engine. Therefore, the internal combustion engine is started more smoothly. In addition, it is possible to avoid the situation in which the start control for the internal combustion engine is started before learning of the reference position is completed. Therefore, it is possible to initiate the start control for the internal combustion engine after learning of the reference position is surely completed.

However, as in the case of the variable valve timing control apparatus described in JP-A-2004-156461, if the phase of the valve is learned before the internal combustion engine is started, that is, when a camshaft is stopped, it is hard to change the phase of the valve to the phase that should be learned, because a high resistance is generated when the camshaft is rotated. Therefore, the accuracy of learning may deteriorate. In addition, the vehicle is not allowed to travel until learning of the reference position is completed.

SUMMARY OF THE INVENTION

The invention provides a control unit and control method for a variable valve timing mechanism that minimizes deterioration of, for example, exhaust emission, a program for implementing the control method, and a recording medium on which the program is recorded. The invention also provides a control unit and control method, with which a valve phase is accurately learned while a vehicle is traveling, a program for implementing the control method, and a recording medium on which the program is recorded.

A first aspect of the invention relates to a control unit for a variable valve timing mechanism that changes a valve phase of at least one of an intake valve and an exhaust valve within a first range from a first phase to a second phase by changing a phase of a camshaft with respect to an output shaft of an internal combustion engine. The control unit includes: a detector that detects the valve phase; a first control unit that executes a control for bringing the valve phase to the first phase, when the internal combustion engine is stopped; and a learning unit that learns the valve phase detected by the detector, when the valve phase is controlled to the first phase. A second aspect of the invention relates to a control method for a variable valve timing mechanism, which includes steps that correspond to the elements of the control unit according to the first aspect of the invention.

A third aspect of the invention relates to the control unit according to the first aspect of the invention. According to the third aspect of the invention, there is further provided a second control unit that executes a control for changing the valve phase within a second range that does not include the first phase, when the internal combustion engine is operating. A fourth aspect of the invention relates to the control method which has the same feature as that of the control unit according to the third aspect of the invention.

According to the third and fourth aspects of the invention, the variable valve timing mechanism changes the valve phase of at least one of the intake valve and the exhaust valve within the first range from the first phase to the second phase. When the internal combustion engine is operating, the valve phase is changed within the second range that does not include the first phase. When the internal combustion engine is stopped, the valve phase is controlled to the first phase. Thus, when the exhaust emission is less likely to deteriorate because the internal combustion engine is stopped, the valve phase is brought to the first phase. When the valve phase is controlled to the first phase, the phase, which is detected by the detector that detects the valve phase, is learned. Therefore, it is possible to learn the phase, which is detected by the detected at the first phase, without causing, for example, deterioration of the exhaust emission. As a result, it is possible to provide the control unit and control method for a variable valve timing mechanism, which minimizes, for example, deterioration of exhaust emission.

A fifth aspect of the invention relates to the control unit according to the first aspect of the invention. According to the fifth aspect of the invention, the first control unit executes the control for bringing the valve phase to the first phase, when fuel injection is stopped in the internal combustion engine. A sixth aspect of the invention relates to the control method which has the same feature as that of the control unit according to the fifth aspect of the invention.

According to the fifth and sixth aspects of the invention, when, for example, the exhaust emission is less likely to deteriorate because the fuel injection is stopped in the internal combustion engine, it is possible to learn the phase, which is detected by the detector at the first phase.

A seventh aspect of the invention relates to the control unit according to the first aspect of the invention. According to the seventh aspect of the invention, the internal combustion engine is mounted in a vehicle that travels in a cruise mode selected from among a first mode in which the vehicle travels using drive power generated by the internal combustion engine and a second mode in which the vehicle travels using drive power generated by a drive power source that differs from the internal combustion engine. The first control unit executes the control for bringing the valve phase to the first phase, when the vehicle travels in the second mode. An eighth aspect of the invention relates to the control method which has the same features as those of the control unit according to the seventh aspect of the invention.

According to the seventh and eighth aspects of the invention, it is possible to learn the phase, which is detected by the detector at the first phase, when, for example, the exhaust emission is less likely to deteriorate because the hybrid vehicle travels using the drive power generated by the drive power source that differs from the internal combustion engine when the internal combustion engine is stopped.

A ninth aspect of the invention relates to the control unit according to any one of the first, third, fifth and seventh aspects of the invention. According to the ninth aspect of the invention, the first phase is the most retarded phase in the first range. A tenth aspect of the invention relates to the control method which has the same feature as that of the control unit according to the ninth aspect of the invention.

According to the ninth and tenth aspects of the invention, it is possible to learn the phase that is detected by the detector at the most retarded phase.

An eleventh aspect of the invention relates to the control unit according to the first aspect of the invention. According to the eleventh aspect of the invention, the control unit may be used for a variable valve timing mechanism arranged in a vehicle that is provided with the internal combustion engine and a drive power source that differs from the internal combustion engine. The control unit may further include: a second control unit that executes a control so that the vehicle travels using drive power generated by the drive power source without operating the internal combustion engine; and a third control unit that executes a control so that the camshaft is rotated by drive power generated by a rotary electric machine, when the vehicle travels using the drive power generated by the drive power source without operating the internal combustion engine. The first control unit may execute the control for bringing the valve phase to the first phase, when the camshaft is rotated by the drive power generated by the rotary electric machine. A twelfth aspect of the invention relates the control method which has the same features as those of the control unit according to the eleventh aspect of the invention.

According to the eleventh and twelfth aspects of the invention, the vehicle is provided with the internal combustion engine and the drive power source that differs from the internal combustion engine. The valve phase of at least one of the intake valve and the exhaust valve is changed within the first range from the first phase to the second phase by changing the phase of the camshaft with respect to the output shaft of the internal combustion engine. The vehicle travels using the drive power generated by the drive power source that differs from the internal combustion engine without operating the internal combustion engine. The camshaft is rotated by the drive power generated by the rotary electric machine when the vehicle travels using the drive power generated by the drive power source that differs from the internal combustion engine. Thus, a rotational resistance of the camshaft, which is generated when the phase is changed, is reduced more effectively than when the camshaft is stopped. In this state, the valve phase is controlled to the first phase. Therefore, it is possible to reliably bring the valve phase to the first phase. The phase detected by the valve phase detector is learned when the valve phase is controlled to the first phase. As a result, it is possible to provide the control unit and control method for a variable valve timing mechanism, with which the valve phase is accurately learned while the vehicle is traveling.

A thirteenth aspect of the invention relates to the control unit according to the eleventh aspect of the invention. According to the thirteenth aspect of the invention, the second control unit may execute the control so that the vehicle travels using the drive power generated by the drive power source without operating the internal combustion engine, when data that indicates the learned phase is erased. A fourteenth aspect of the invention relates the control method which has the same feature as that of the control unit according to the thirteenth aspect of the invention.

According to the thirteenth and fourteenth aspects of the invention, when the data that indicates the learned phase is erased, the control is executed so that the vehicle travels using the drive power generated by the drive power source that differs from the internal combustion engine without operating the internal combustion engine, because the valve phase is not accurately controlled if the data is erased. Thus, it is possible to minimize, for example, deterioration of exhaust emission.

A fifteenth aspect of the invention relates to the control unit according to the eleventh or thirteenth aspect of the invention. According to the fifteenth aspect of the invention, there may be further provided a fourth control unit that executes a control so that the valve phase changes within a range that does not include the first phase, when the internal combustion engine is operating. A sixteenth aspect of the invention relates the control method which has the same feature as that of the control unit according to the fifteenth aspect of the invention.

According to the fifteenth and sixteenth aspects of the invention, the valve phase is changed within the range that does not include the first phase, when the internal combustion engine is operating. Therefore, for example, when the first phase is not appropriate as the phase that is used when the internal combustion engine is operating, the internal combustion engine is operated without using the first phase. Therefore, it is possible to minimize deterioration of output from the internal combustion engine or exhaust emission when the internal combustion engine is operating.

A seventeenth aspect of the invention relates to the control unit according to any one of the eleventh, thirteenth, and fifteenth aspects of the invention. According to the seventeenth aspect of the invention, the first phase may be the most retarded phase in the first range. An eighteenth aspect of the invention relates to the control method which has the same feature as that of the control unit according to the seventeenth aspect of the invention.

According to the seventeenth and eighteenth aspects of the invention, it is possible to accurately learn the valve phase at the most retarded phase while the vehicle is traveling.

A nineteenth aspect of the invention relates to a program based on which a computer implements the control method according any one of the second, fourth, sixth, eighth, tenth, twelfth, fourteenth, sixteenth and eighteenth aspects of the invention. A twentieth aspect of the invention relates to a computer-readable recording medium on which a program based on which a computer implements the control method according to any one of the second, fourth, sixth, eighth, tenth, twelfth, fourteenth, sixteenth and eighteenth aspects of the invention is recorded.

According to the nineteenth and twentieth aspects of the invention, it is possible to implement the control method for a variable valve timing mechanism according to any one of the second, fourth, sixth, eighth, tenth, twelfth, fourteenth, sixteenth and eighteenth aspects of the invention, using either an all-purpose computer or a dedicated-purpose computer.

BRIEF DESCRIPTION OF THE DRAWINGS

The foregoing and further features and advantages of the invention will become apparent from the following description of embodiments with reference to the accompanying drawings, wherein the same or corresponding elements will be denoted by the same reference numerals and wherein.

DETAILED DESCRIPTION OF EMBODIMENTS

Figure 1:
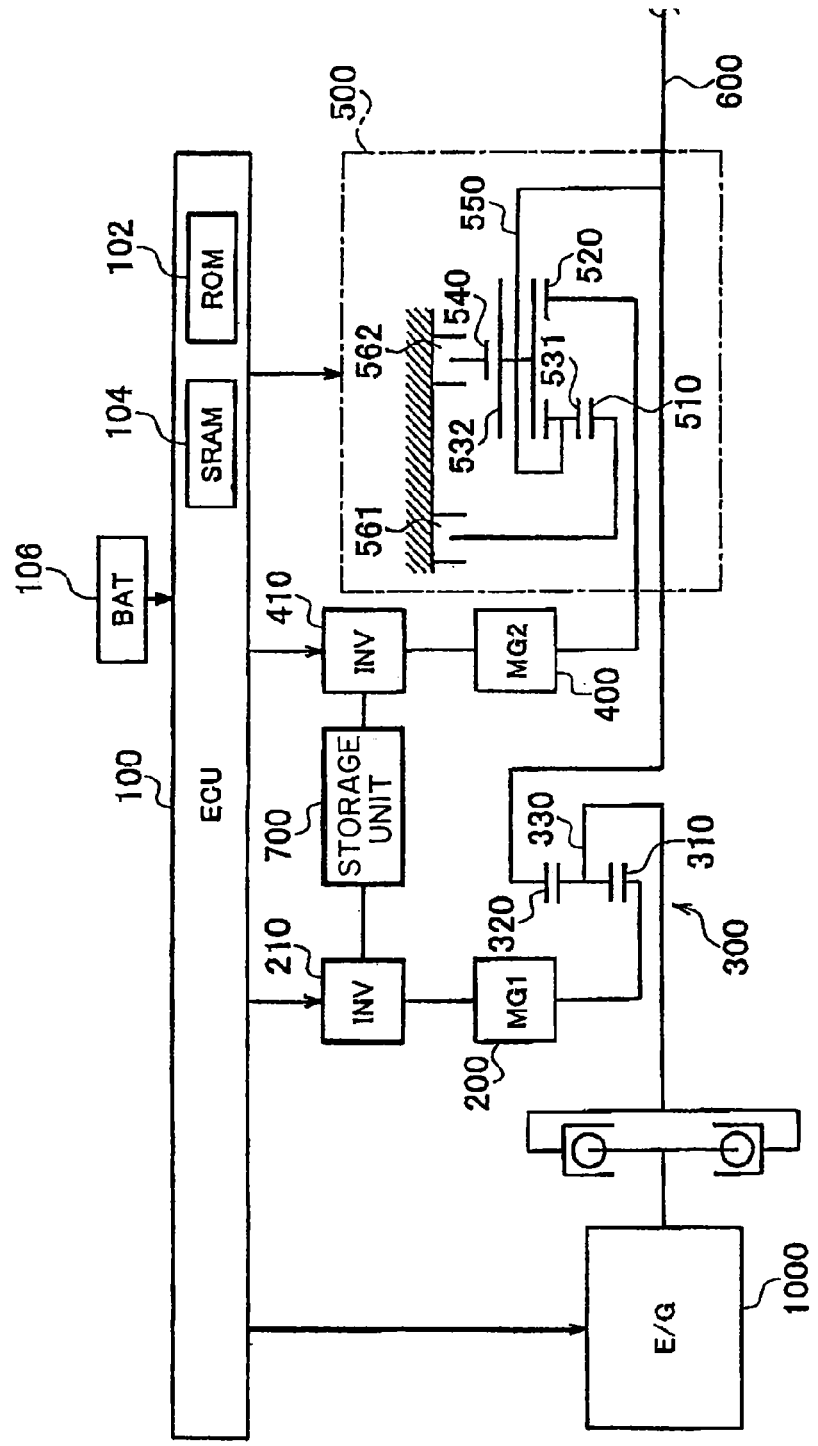
FIG. 1 is a view schematically showing the structure of a power train of a hybrid vehicle.

Hereafter, embodiments of the invention will be described with reference to the accompanying drawings. In the following description, the same or corresponding elements will be denoted by the same reference numerals. The names and functions of the elements having the same reference numerals are also the same. Accordingly, the descriptions concerning the elements having the same reference numerals will be provided only once below.

A power train of a hybrid vehicle provided with a control unit according to a first embodiment of the invention will be described with reference to FIG. 1. The control unit according to the first embodiment of the invention is implemented when an ECU (Electronic Control Unit) 100 executes a program stored in a ROM (Read Only Memory) 102 of the ECU 100. The ECU 100 may be divided into multiple ECUs. The program that is executed by the ECU 100 may be recorded in a CD (Compact Disc) or a DVD (Digital Versatile Disc), and distributed to the market.

As shown in FIG. 1, the power train is formed mainly of an engine 1000, a first MG (Motor Generator) 200, a power split mechanism 300, a second MG 400, and a transmission 500. The power split mechanism 300 is provided between the engine 1000 and the first MG 200. The power split mechanism 300 combines the torque from the engine 1000 with the torque from the first MG 200, or splits the torque from the engine 1000 into the torque that is transferred to the first MG 200 and the torque that is transferred to drive wheels.

The engine 1000 is a known power unit that burns fuel to generate drive power. The operating state of the engine 1000 such as the throttle valve opening amount (intake air amount), the fuel supply amount, and the ignition timing is controlled electrically. The control is executed by the ECU 100 that is formed mainly of a microcomputer. The engine 1000 will be described later in detail.

The first MG 200 is, for example, a three-phase alternating current rotary electric machine, and is structured to function as an electric motor (motor) and function also as a generator. The first MG 200 is connected to a storage unit 700, for example, a battery, via an inverter 210. The output torque from the first MG 200 or the regenerative torque is appropriately adjusted by controlling the inverter 210. The inverter 210 is controlled by the ECU 100. A stator (not shown) of the first MG 200 is locked so as not to rotate.

The power split mechanism 300 is a known gear mechanism that produces a differential effect by using three rotational elements, that is, a sun gear (S) 310 which is an external gear, a ring gear (R) 320 which is an internal gear arranged coaxially with the sun gear (S) 310, and a carrier (C) 330 that supports pinions which are in mesh with the sun gear (S) 310 and the ring gear (R) 320 in such a manner that the pinions are allowed to rotate about their axes and turn around the sun gear (S) 310. An output shaft of the engine 1000 is connected to the carrier (C) 330, which is a first rotational element, via a damper. In other words, the carrier (C) 330 serves as an input element.

A rotor (not shown) of the first MG 200 is connected to the sun gear (S) 310, which is a second rotational element. Therefore, the sun gear (S) 310 serves as a so-called reaction force element, and the ring gear (R) 320, which is a third rotational element, serves as an output element. The ring gear (R) 320 is connected to an output shaft 600 that is connected to the drive wheels (not shown).

Figure 2:
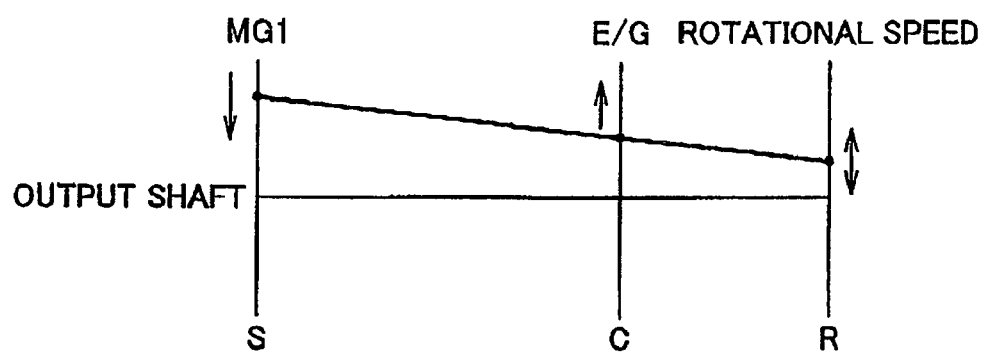
FIG. 2 is a collinear diagram for a power split mechanism.

FIG. 2 is a collinear diagram for the power split mechanism 300. As shown in FIG. 2, when the torque from the first MG 200 is input in the sun gear (S) 310 as the reaction torque for the torque which is output from the engine 1000 and input in the carrier (C) 330, the ring gear (R) 320, which serves as an output element, outputs a torque that is obtained by increasing or decreasing the torque output from the engine 1000 using the reaction torque. In this case, the rotor of the first MG 200 is rotated by this torque, and the first MG 200 serves as a generator. If the rotational speed (output rotational speed) of the ring gear (R) 320 is constant, the rotational speed of the engine 1000 may be continuously (steplessly) changed by adjusting the rotational speed of the first MG 200. That is, a control for setting the rotational speed of the engine 1000 to a value, at which the optimum fuel efficiency is achieved, is executed by controlling the first MG 200. The ECU 100 executes the control.

When the engine 1000 is stopped while the vehicle is traveling, the first MG 200 is rotating in the reverse direction. In this state, if the first MG 200 is used as an electric motor to produce a torque that is applied in the forward rotational direction, a torque, which is applied in such a direction that the engine 1000 is rotated in the forward direction, is applied to the engine 1000 that is connected to the carrier (C) 330. Thus, the engine 1000 is started by the first MG 200 (motoring or cranking). In this case, a torque, which is applied in such a direction that the rotation of the output shaft 600 is stopped, is applied to the output shaft 600. Therefore, the drive torque used to allow the vehicle to travel is maintained by controlling the torque that is output from the second MG 400, and, at the same time, the engine 1000 is started smoothly. This type of hybrid drive system is called a mechanical split type hybrid system or a split type hybrid system.

Referring again to FIG. 1, the second MG 400 is, for example, a three-phase alternating current rotary electric machine, and is structured to function as an electric motor and function also as a generator. The second MG 400 is connected to the storage unit 700, for example, a battery, via an inverter 410. The torque that is obtained by the powering operation and the torque that is obtained by the regenerative operation are adjusted by controlling the inverter 410. A stator (not shown) of the second MG 400 is locked so as not to rotate.

The transmission 500 is formed of a set of Ravigneaux planetary gear mechanism. The transmission 500 includes a first sun gear (S1) 510 and a second sun gear (S2) 520, which are external gears. First pinions 531 are in mesh with the first sun gear (S1) 510, the first pinions 531 are in mesh with second pinions 532, and the second pinions 532 are in mesh with a ring gear (R) 540 that is arranged coaxially with the sun gears 510 and 520.

The pinions 531 and 532 are supported by a carrier (C) 550 in such a manner that the pinions 531 and 532 are allowed to rotate about their axes and turn around the sun gears 510 and 520. The second sun gear (S2) 520 is in mesh with the second pinions 532. Therefore, the first sun gear (S1) 510 and the ring gear (R) 540 together with the pinions 531 and 532 constitute a mechanism that corresponds to a double-pinion planetary gear mechanism. The second sun gear (S2) 520 and the ring gear (R) 540 together with the second pinions 532 constitute a mechanism that corresponds to a single-pinion planetary gear mechanism.

The transmission 500 further includes a B1 brake 561 that selectively locks the first sun gear (S1) 510, and a B2 brake 562 that selectively locks the ring gear (R) 540. These brakes 561 and 562 are so-called friction engaging elements that generate engagement force using frictional force. Multi-disc engaging devices or band-type engaging devices may be used as the brakes 561 and 562. Each of the brakes 561 and 562 is structured so that the torque capacity thereof is continuously changes based on the engaging force that is hydraulically generated. In addition, the second MG 400 is connected to the second sun gear (S2) 520. The carrier (C) 550 is connected to the output shaft 600.

Therefore, in the transmission 500, the second sun gear (S2) 520 serves as a so-called input element, and the carrier (C) 550 serves as an output element. When the B1 brake 561 is engaged, a high gear, of which the gear ratio is higher than "1", is selected. When the B2 brake 562 is engaged instead of the B1 brake 561, a low gear, of which the gear ratio is higher than the gear ratio of the high gear, is selected.

The transmission 500 is shifted between these gears based on the vehicle drive state such as a vehicle speed and a required drive power (or an accelerator pedal operation amount). More specifically, shift ranges are set in advance in the form of a map (shift diagram), and a control is executed to select one of the gears based on the detected vehicle drive state.

Figure 3:
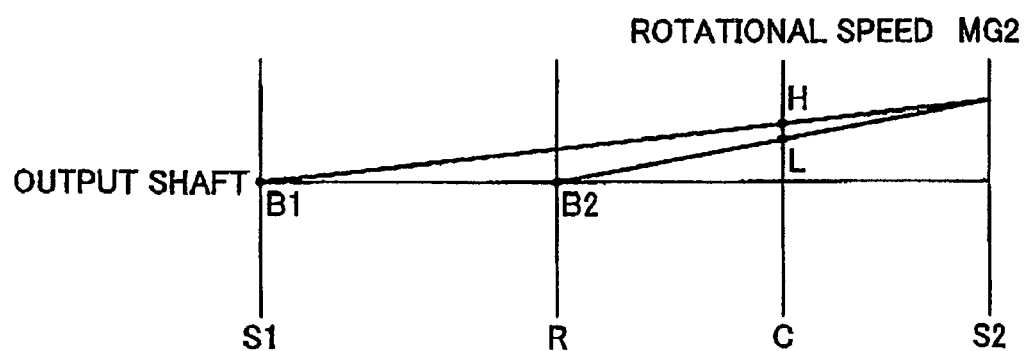
FIG. 3 is a collinear diagram for a transmission.

FIG. 3 is a collinear diagram for the transmission 500. As shown in FIG. 3, when the ring gear (R) 540 is locked by the B2 brake 562, a low gear L is selected, and the torque output from the second MG 400 is amplified based on the gear ratio, and the amplified torque is applied to the output shaft 600. When the first sun gear (S1) 510 is locked by the B1 brake 561, a high gear H, of which the gear ratio is lower than that of the low gear L, is selected. The gear ratio of the high gear H is also higher than "1". Therefore, the torque output from the second MG 400 is amplified based on the gear ratio, and the amplified torque is applied to the output shaft 600.

When the low gear L or the high gear H is maintained, the torque that is obtained by amplifying the torque output from the second MG 400 based on the gear ratio is applied to the output shaft 600. However, when the gears are being shifted, the torque, which is influenced by the torque capacities of the brakes 561 and 562 and the inertia torque due to a change in the rotational speed, is applied to the output shaft 600. The torque that is applied to the output shaft 600 is a positive torque when the second MG 400 is in the drive state, and is a negative torque when the second MG 400 is in the driven state.

In the first embodiment of the invention, the hybrid vehicle travels in one of a first mode in which the hybrid vehicle travels using only the drive power generated by the engine 1000, a second mode in which the engine 1000 is stopped and the hybrid vehicle travels using only the drive power generated by the second MG 400, and a third mode in which the hybrid vehicle travels using both the drive power generated by the engine 1000 and the drive power generated by the second MG 400. The cruise mode is selected based on various parameters such as the accelerator pedal operation amount, and the remaining capacity of the storage unit 700.

A technology known in the technical field that pertains to hybrid vehicles may be used to form a method for selecting the cruise mode. Therefore, the detailed description on the method for selecting the cruise mode will not be provided below. In addition, the number of cruise modes is not limited to three.

The engine 1000 will be described in further detail with reference to FIG. 4. The engine 1000 is an eight-cylinder V-type engine including an "A" bank 1010 and a "B" bank 1012 each of which has four cylinders therein. Note that, engines other than an eight-cylinder V-type engine may be used.

Air that has passed through an air cleaner 1020 is supplied to the engine 1000. A throttle valve 1030 adjusts the amount of air supplied to the engine 1000. The throttle valve 1030 is an electronically-controlled throttle valve that is driven by a motor.

The air is introduced into a cylinder 1040 through an intake passage 1032. The air is then mixed with fuel in the cylinder 1040 (combustion chamber). The fuel is injected from an injector 1050 directly into the cylinder 1040. Namely, the injection hole of the injector 1050 is positioned within the cylinder 1040.

The fuel is injected into the cylinder 1040 in the intake stroke. The time at which the fuel is injected need not be in the intake stroke. The description concerning the first embodiment of the invention will be provided on the assumption that the engine 1000 is a direct-injection engine where the injection hole of the injector 1050 is positioned within the cylinder 1040. In addition to the injector 1050 for direct-injection, an injector for port-injection may be provided. Alternatively, only an injector for port-injection may be provided.

The air-fuel mixture in the cylinder 1040 is ignited by a spark plug 1060, and then burned. The burned air-fuel mixture, namely, the exhaust gas, is purified by a three-way catalyst 1070, and then discharged to the outside of the vehicle. A piston 1080 is pushed down due to combustion of the air-fuel mixture, whereby a crankshaft 1090 is rotated.

An intake valve 1100 and an exhaust valve 1110 are provided on the top of the cylinder 1040. The intake valve 1100 is driven by an intake camshaft 1120, and the exhaust valve 1110 is driven by an exhaust camshaft 1130. The intake camshaft 1120 and the exhaust camshaft 1130 are connected to each other by, for example, a chain or a gear, and rotate at the same rotational speed.

The intake camshaft 1120 and the exhaust camshaft 1130 are connected to the crankshaft 1090 via, for example, a chain or a belt. The rotational speed of each of the intake camshaft 1120 and the exhaust camshaft 1130 is one-half the rotational speed of the crankshaft 1090.

The phase (opening/closing timing) of the intake valve 1100 is controlled by an intake VVT mechanism 2000 which is fitted to the intake camshaft 1120. The phase (opening/closing timing) of the exhaust valve 1110 is controlled by an exhaust VVT mechanism 3000 which is fitted to the exhaust camshaft 1130.

In the first embodiment of the invention, the intake camshaft 1120 and the exhaust camshaft 1130 are rotated by the VVT mechanisms 2000 and 3000, respectively, whereby the phase of the intake valve 1100 and the phase of the exhaust valve 1110 are controlled. That is, the phase of the intake valve 1100 and the phase of the exhaust valve 1110 are changed by changing the phase of the intake camshaft 1120 with respect to the crankshaft 1090 and the phase of the exhaust camshaft 1130 with respect to the crankshaft 1090 using the VVT mechanisms 2000 and 3000, respectively. However, the method for controlling the phase is not limited to this.

Figure 4:
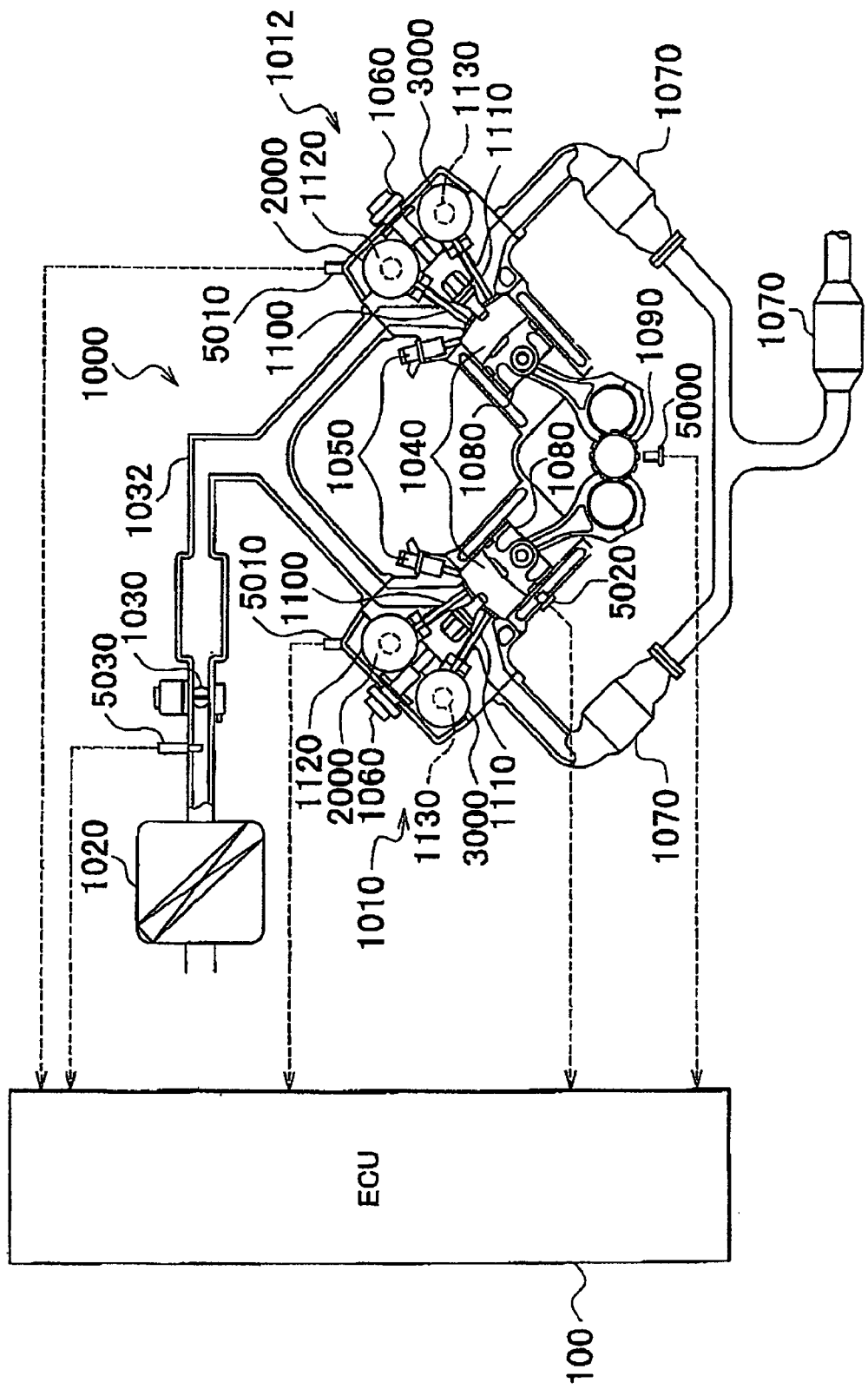
FIG. 4 is a view schematically showing the structure of an engine of the hybrid vehicle.

The intake VVT mechanism 2000 is operated by an electric motor 2060 (not shown in FIG. 4). The electric motor 2060 is controlled by the ECU 100. The magnitude of electric current passing through the electric motor 2060 is detected by an ammeter (not shown) and the voltage applied to the electric motor 2060 is detected by a voltmeter (not shown), and a signal indicating the magnitude of electric current and a signal indicating the voltage are transmitted to the ECU 100.

The exhaust VVT mechanism 3000 is hydraulically operated. Note that, the intake VVT mechanism 2000 may be hydraulically operated. Note that, the exhaust VVT mechanism 3000 may be operated by means of an electric motor.

The ECU 100 receives signals indicating the rotational speed and the crank angle of the crankshaft 1090 from a crank angle sensor 5000. The ECU 100 also receives a signal indicating the phase of the intake camshaft 1120 and a signal indicating the phase of the exhaust camshaft 1130 (the positions of these camshafts in the rotational direction), from a camshaft position sensor 5010. In other words, the ECU 100 receives a signal indicating the phase of the intake valve 1100 and a signal indicating the phase of the exhaust valve 1110 from the cam position sensor 5010. In addition, the ECU 100 receives a signal indicating the rotational speed of the intake cam shaft 1120 and a signal indicating the rotational speed of the exhaust camshaft 1130 from the cam position sensor 5010.

In addition, the ECU 100 receives a signal indicating the temperature of a coolant for the engine 1000 (the coolant temperature) from a coolant temperature sensor 5020, and a signal indicating the amount of air taken in the engine 1000 from an airflow meter 5030.

Further, the ECU 100 receives a signal indicating the rotational speed of an output shaft of the electric motor 2060 from a rotational speed sensor 5040.

The ECU 100 controls the throttle valve opening amount, the ignition timing, the fuel injection timing, the fuel injection amount, the phase of the intake valve 1100, the phase of the exhaust valve 1110, etc. based on the signals received from the above-mentioned sensors and the maps and programs that are stored in a memory (not shown) so that the engine 1000 is placed in the desired operating state.

Figure 5:
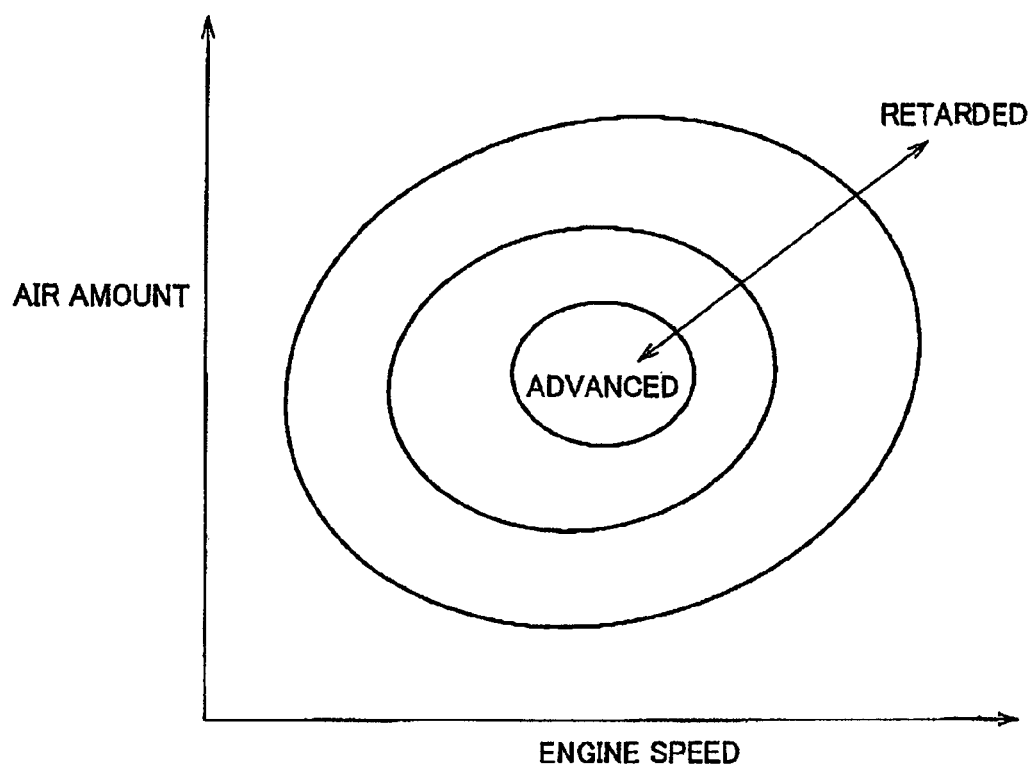
FIG. 5 is a graph showing a map that defines the phase of an intake valve.

According to the first embodiment of the invention, the ECU 100 sets the phase of the intake valve 1100 based on the map that uses an engine speed NE and an intake air amount KL as parameters, as shown in FIG. 5. Multiple maps, used to set the phase of the intake valve 1100 at multiple coolant temperatures, are stored in the memory.

Hereafter, the intake VVT mechanism 2000 will be described in more detail. Note that, the exhaust VVT mechanism 3000 may have the same structure as the intake VVT mechanism 2000 described below.

Figure 6:
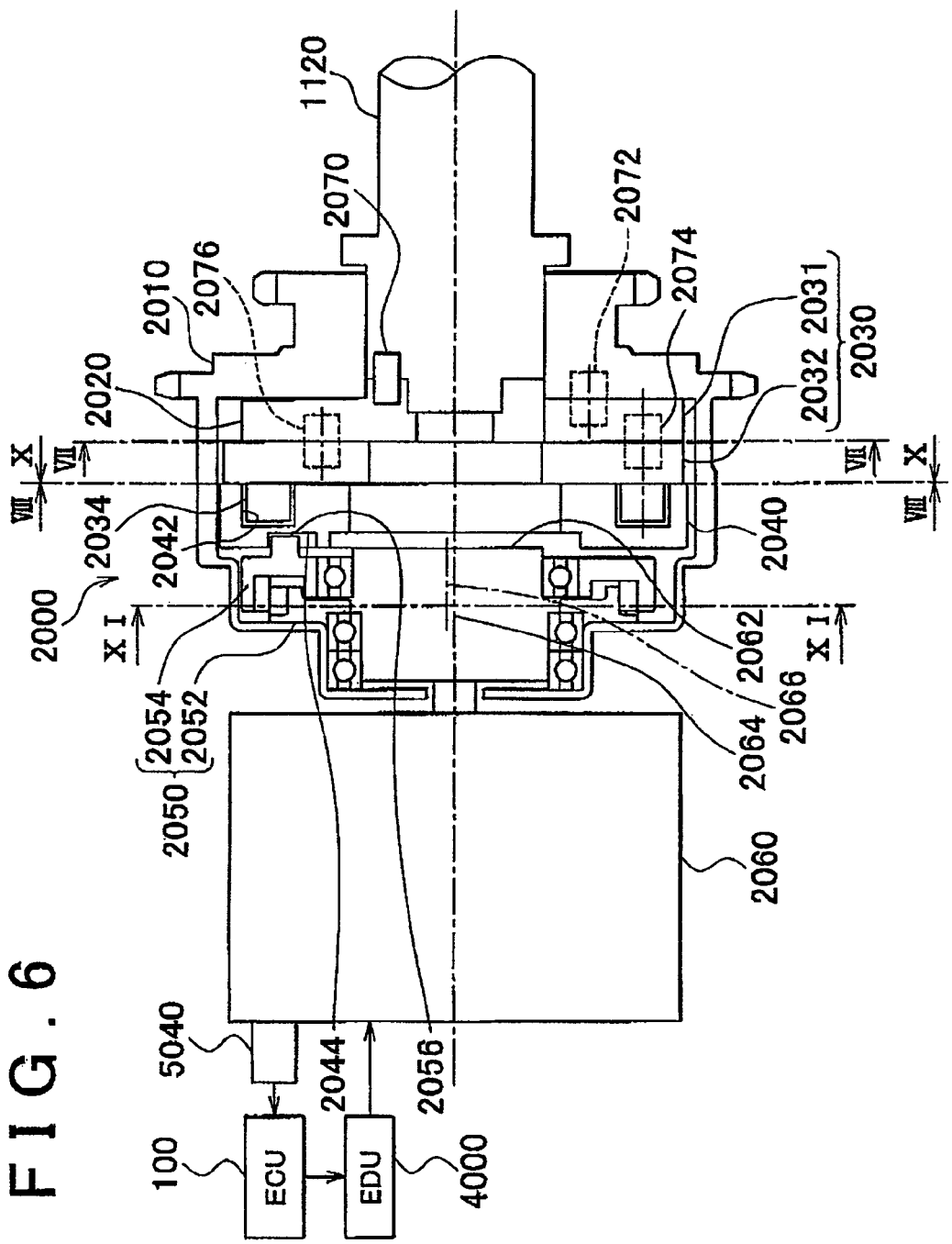
FIG. 6 is a cross-sectional view showing an intake VVT mechanism.

As shown in FIG. 6, the intake VVT mechanism 2000 includes a sprocket 2010, a cam plate 2020, link mechanisms 2030, a guide plate 2040, a speed reducer 2050, and the electric motor 2060.

The sprocket 2010 is connected to the crankshaft 1090 via, for example, a chain. The rotational speed of the sprocket 2010 is one-half the rotational speed of the crankshaft 1090. The intake camshaft 1120 is provided in such a manner that the intake camshaft 1120 is coaxial with the rotational axis of the sprocket 2010 and rotates relative to the sprocket 2010. That is, the intake camshaft 1120 is provided in such a manner that the phase of the intake camshaft 1120 with respect to the crankshaft 1090 can be changed.

The cam plate 2020 is connected to the intake camshaft 1120 with a first pin 2070. In the sprocket 2010, the cam plate 2020 rotates together with the intake camshaft 1120. The cam plate 2020 and the intake camshaft 1120 may be formed integrally with each other.

Figure 7:
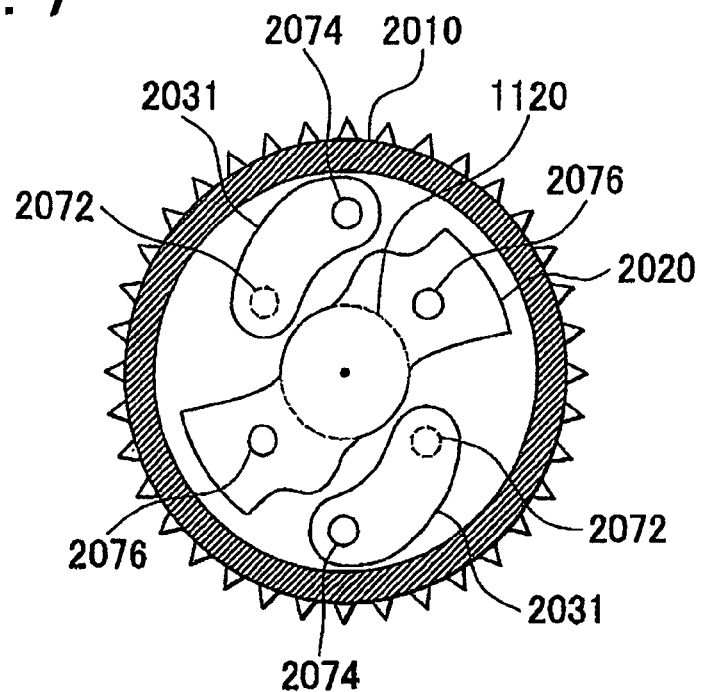
FIG. 7 is a cross-sectional view taken along the line VII-VII in FIG. 6.

Each link mechanism 2030 is formed of a first arm 2031 and a second arm 2032. As shown in FIG. 7, that is, a cross-sectional view taken along the line V11-V11 in FIG. 6, paired first arms 2031 are arranged in the sprocket 2010 so as to be symmetric with respect to the rotational axis of the intake camshaft 1120. Each first arm 2031 is connected to the sprocket 2010 so as to pivot about a second pin 2072.

Figure 8:
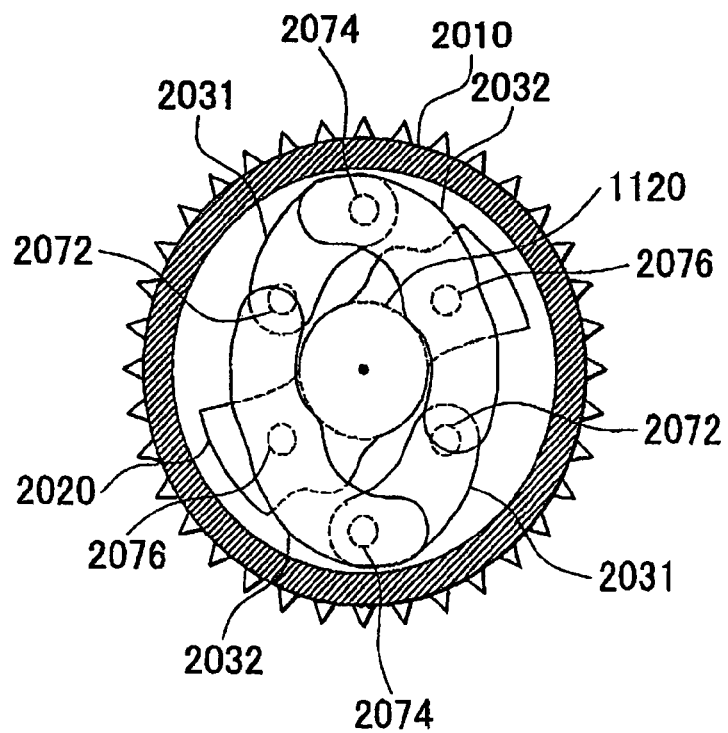
FIG. 8 is a first cross-sectional view taken along the line VIII-VIII in FIG. 6.
Figure 9:
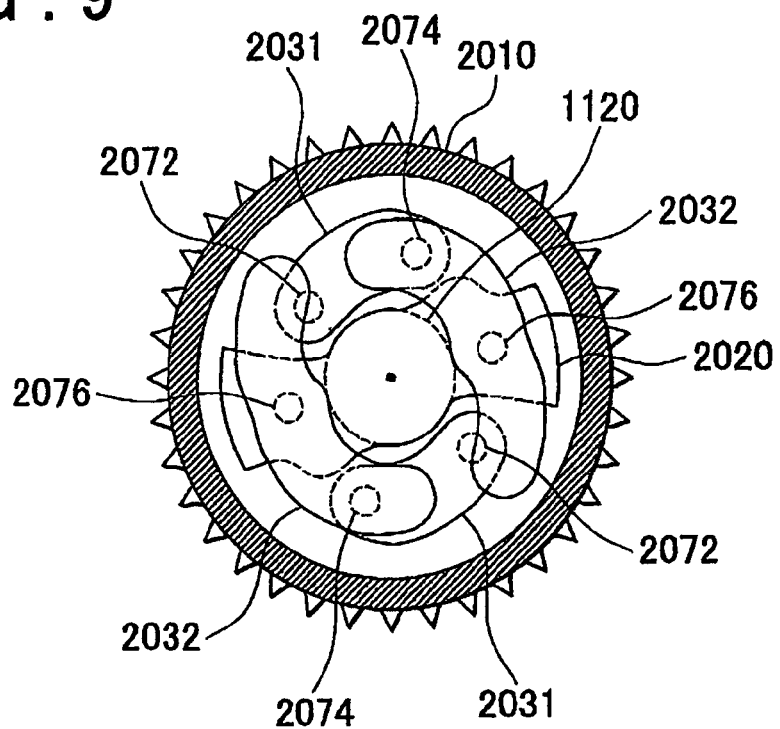
FIG. 9 is a second cross-sectional view taken along the line VIII-VIII in FIG. 6.

As shown in FIG. 8, that is, a cross-sectional view taken along the line in FIG. 6, and FIG. 9 that shows the state achieved by advancing the phase of the intake valve 1100 from the state shown in FIG. 8, the first arms 2031 and the cam plate 2020 are connected to each other by the second arms 2032.

Each second arm 2032 is supported so as to pivot about a third pin 2074, with respect to the first arm 2031. Each second arm 2032 is supported so as to pivot about a fourth pin 2076, with respect to the cam plate 2020.

The intake camshaft 1120 is rotated relative to the sprocket 2010 by the pair of link mechanisms 2030, whereby the phase of the intake valve 1100 is changed. Accordingly, even if one of the link mechanisms 2030 breaks and snaps, the phase of the intake valve 1100 is changed by the other link mechanism 2030.

Referring again to FIG. 6, a control pin 2034 is fitted on one face of each link mechanism 2030 (more specifically, the second arm 2032), the face being proximal to the guide plate 2040. The control pin 2034 is arranged coaxially with the third pin 2074. Each control pin 2034 slides within a guide groove 2042 formed in the guide plate 2040.

Each control pin 2034 moves in the radial direction while sliding within the guide groove 2042 formed in the guide plate 2040. The movement of each control pin 2034 in the radial direction rotates the intake camshaft 1120 relative to the sprocket 2010.

Figure 10:
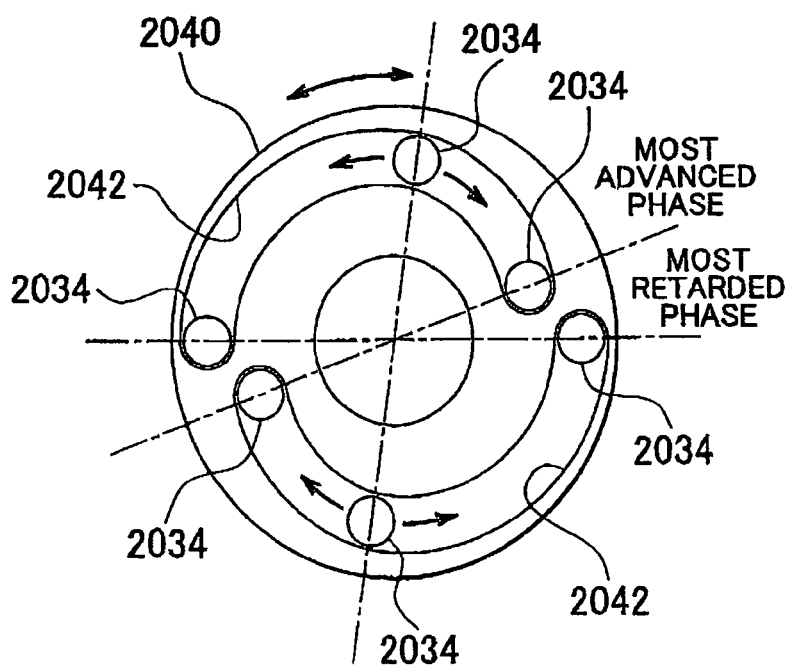
FIG. 10 is a cross-sectional view taken along the line X-X in FIG. 6.

As shown in FIG. 10, that is, a cross-sectional view taken along the line X-X in FIG. 6, the guide groove 2042 is formed in a spiral fashion so that the control pin 2034 moves in the radial direction in accordance with the rotation of the guide plate 2040. However, the shape of the guide groove 2042 is not limited to this.

As the distance between the control pin 2034 and the axis of the guide plate 2040 increases in the radial direction, the phase of the intake valve 1100 is more retarded. Namely, the amount of change in the phase corresponds to the amount by which each link mechanism 2030 is operated in accordance with the movement of the control pin 2034 in the radial direction. Note that, as the distance between the control pin 2034 and the axis of the guide plate 2040 increases in the radial direction, the phase of the intake valve 1100 may be more advanced.

As shown in FIG. 10, when the control pin 2034 reaches the end of the guide groove 2042, the operation of the link mechanism 2030 is restricted. Accordingly, the phase, at which the control pin 2034 reaches the end of the guide groove 2042, is the mechanically determined most advanced phase or the mechanically determined most retarded phase of the intake valve 1100.

Referring again to FIG. 6, multiple recesses 2044 are formed in one face of the guide plate 2040, the face being proximal to the speed reducer 2050. The recesses 2044 are used to connect the guide plate 2040 and the speed reducer 2050 to each other.

The speed reducer 2050 is formed of an external gear 2052 and an internal gear 2054. The external gear 2052 is fixed to the sprocket 2010 so as to rotate together with the sprocket 2010.

Multiple projections 2056, which are fitted in the recesses 2044 of the guide plate 2040, are formed on the internal gear 2054. The internal gear 2054 is supported so as to be rotatable about an eccentric axis 2066 of a coupling 2062 of which the axis deviates from an axis 2064 of the output shaft of the electric motor 2060.

Figure 11:
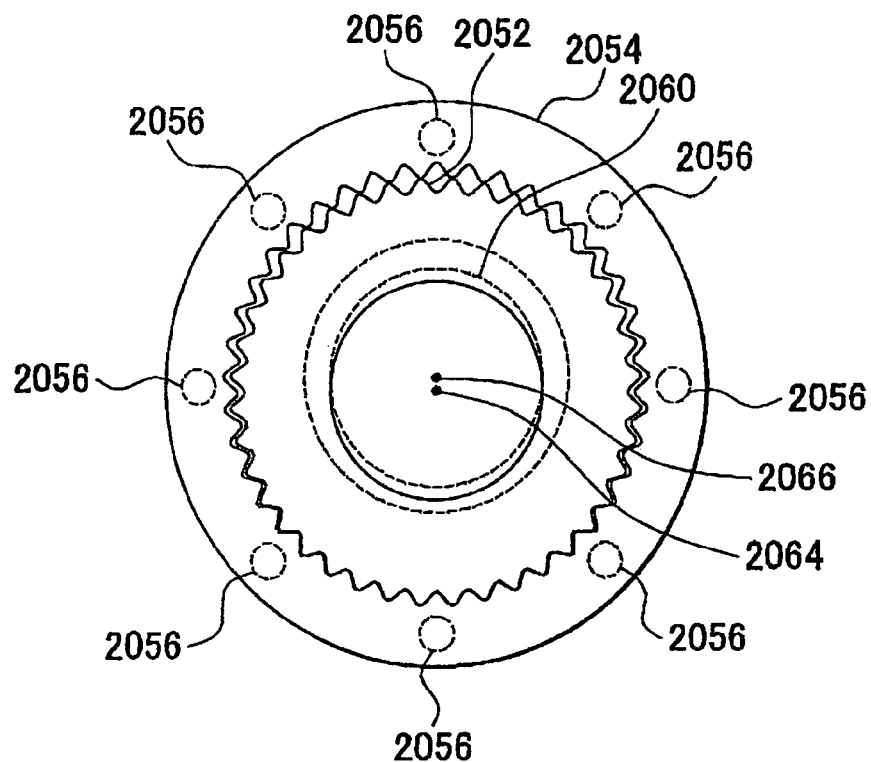
FIG. 11 is a cross-sectional view taken along the line XI-XI in FIG. 6.

FIG. 11 shows a cross-sectional view taken along the line XI-XI in FIG. 6. The internal gear 2054 is arranged in such a manner that part of the multiple teeth thereof mesh with the external gear 2052. When the rotational speed of the output shaft of the electric motor 2060 is equal to the rotational speed of the sprocket 2010, the coupling 2062 and the internal gear 2054 rotate at the same rotational speed as the external gear 2052 (the sprocket 2010). In this case, the guide plate 2040 rotates at the same rotational speed as the sprocket 2010, and the phase of the intake valve 1100 is maintained.

When the coupling 2062 is rotated about the axis 2064 relative to the external gear 2052 by the electric motor 2060, the entirety of the internal gear 2054 turns around the axis 2064, and, at the same time, the internal gear 2054 rotates about the eccentric axis 2066. The rotational movement of the internal gear 2054 causes the guide plate 2040 to rotate relative to the sprocket 2010, whereby the phase of the intake valve 1100 is changed.

The phase of the intake valve 1100 is changed by reducing the relative rotational speed (the operation amount of the electric motor 2060) between the output shaft of the electric motor 2060 and the sprocket 2010 using the speed reducer 2050, the guide plate 2040 and the link mechanisms 2030. Alternatively, the phase of the intake valve 1100 may be changed by increasing the relative rotational speed between the output shaft of the electric motor 2060 and the sprocket 2010.

Figure 12:
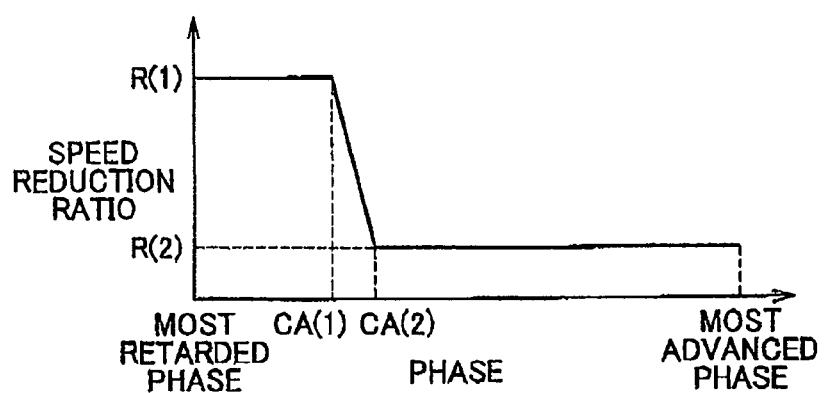
FIG. 12 is a graph showing the speed reduction ratio that elements of the intake VVT mechanism realize in cooperation.

As shown in FIG. 12, the speed reduction ratio that the elements of the intake VVT mechanism 2000 realize in cooperation, namely, the ratio of the relative rotational speed between the output shaft of the electric motor 2060 and the sprocket 2010 to the amount of change in the phase of the intake valve 1100, may take a value corresponding to the phase of the intake valve 1100. According to the first embodiment of the invention, as the speed reduction ratio increases, the amount of change in the phase with respect to the relative rotational speed between the output shaft of the electric motor 2060 and the sprocket 2010 decreases.

When the phase of the intake valve 1100 is within the retardation region that extends from the most retarded phase to CA1, the speed reduction ratio that the elements of the intake VVT mechanism 2000 realize in cooperation is R1. When the phase of the intake valve 1100 is within the advance region that extends from CA2 (CA2 is the phase that is more advanced than CA 1) to the most advanced phase, the speed reduction ratio that the elements of the intake VVT mechanism 2000 realize in cooperation is R2 (R1>R2).

When the phase of the intake valve 1100 is within the intermediate region that extends from CA1 to CA2, the speed reduction ratio that the elements of the intake VVT mechanism 2000 realize in cooperation changes at a predetermined rate ((R2−R1)/(CA2−CA1)).

The effects of the intake VVT mechanism 2000 of the variable valve timing mechanism will be described below.

Figure 13:
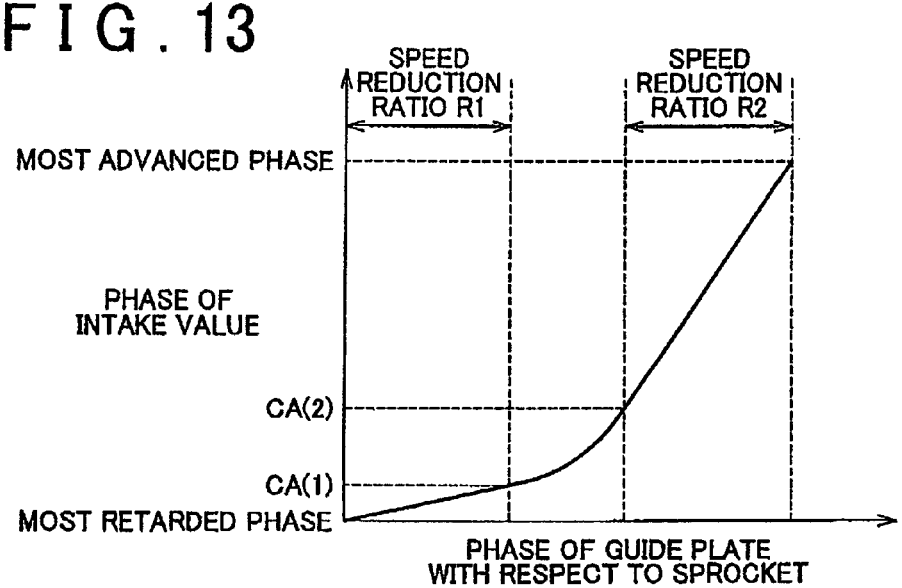
FIG. 13 is a graph showing the relationship between the phase of a guide plate relative to a sprocket and the phase of the intake valve.

When the phase of the intake valve 1100 (the intake camshaft 1120) is advanced, the electric motor 2060 is operated to rotate the guide plate 2040 relative to the sprocket 2010. As a result, the phase of the intake valve 1100 is advanced, as shown in FIG. 13.

When the phase of the intake valve 1100 is within the retardation region that extends from the most retarded phase to CA1, the relative rotational speed between the output shaft of the electric motor 2060 and the sprocket 2010 is reduced at the speed reduction ratio R1. As a result, the phase of the intake valve 1100 is advanced.

When the phase of the intake valve 1100 is within the advance region that extends from CA2 to the most advanced phase, the relative rotational speed between the output shaft of the electric motor 2060 and the sprocket 2010 is reduced at the speed reduction ratio R2. As a result, the phase of the intake valve 1100 is advanced.

When the phase of the intake valve 1100 is retarded, the output shaft of the electric motor 2060 is rotated relative to the sprocket 2010 in the direction opposite to the direction in which the phase of the intake valve 1100 is advanced. When the phase is retarded, the relative rotational speed between the output shaft of the electric motor 2060 and the sprocket 2010 is reduced in the manner similar to that when the phase is advanced. When the phase of the intake valve 1100 is within the retardation region that extends from the most retarded phase to CA1, the relative rotational speed between the output shaft of the electric motor 2060 and the sprocket 2010 is reduced at the speed reduction ratio R1. As a result, the phase is retarded. When the phase of the intake valve 1100 is within the advance region that extends from CA2 to the most advanced phase, the relative rotational speed between the output shaft of the electric motor 2060 and the sprocket 2010 is reduced at the speed reduction ratio R2. As a result, the phase is retarded.

Accordingly, as long as the direction of the relative rotation between the output shaft of the electric motor 2060 and the sprocket 2010 remains unchanged, the phase of the intake valve 1100 may be advanced or retarded in both the retardation region that extends from the most retarded phase to CA 1 and the advance region that extends from the CA2 to the most advanced phase. In this case, in the advance region that extends from CA2 to the most advanced phase, the phase is advanced or retarded by an amount larger than that in the retardation region that extends from the most retarded phase to CA1. Accordingly, the advance region is broader in the phase change width than the retardation region.

In the retardation region that extends from the most retarded phase to CA1, the speed reduction ratio is high. Accordingly, a high torque is required to rotate the Output shaft of the electric motor 2060 using the torque applied to the intake camshaft 1120 in accordance with the operation of the engine 1000. Therefore, even when the electric motor 2060 does not produce a torque, for example, even when the electric motor 2060 is stopped, the rotation of the output shaft of the electric motor 2060, which is caused by the torque applied to the intake camshaft 1120, is restricted. This restricts the deviation of the actual phase from the phase used in the control.

When the phase of the intake valve 1100 is within the intermediate region that extends from CA1 to CA2, the relative rotational speed between the output shaft of the electric motor 2060 and the sprocket 2010 is reduced at the speed reduction ratio that changes at a predetermined rate. As a result, the phase of the intake valve 1100 is advanced or retarded.

When the phase of the intake valve 1100 is shifted from the retardation region to the advance region, or from the advance region to the retardation region, the amount of change in the phase with respect to the relative rotational speed between the output shaft of the electric motor 2060 and the sprocket 2010 is gradually increased or reduced. Accordingly, an abrupt stepwise change in the amount of change in the phase is restricted to restrict an abrupt change in the phase. As a result, the phase of the intake valve 1100 is controlled more appropriately.

Referring again to FIG. 6, a duty-control is executed over the electric motor 2060 by the ECU 100 via an EDU (Electronic Driver Unit) 4000. In the duty control, the duty ratio, which is a ratio between the duration in which a switching element (not shown) of the EDU 4000 is on and the duration in which the switching element is off, is set, and the operating voltage of the electric motor 2060 is controlled by operating the switching element at the duty ratio.

That is, the operating voltage of the electric motor 2060 is a voltage that corresponds to the duty ratio. As the duty ratio increases, the operating voltage also increases. As the operating voltage increases, the torque generated by the electric motor 2060 increases. Also, as the operating current increases, the electric motor 2060 generates a higher torque.

A signal indicating the duty ratio set by the ECU 100 is transmitted to the EDU 4000. The EDU 4000 outputs a voltage that corresponds to the duty ratio. Thus, the electric motor 2060 is driven.

Instead of setting the duty ratio, the operating voltage or the operating current of the electric motor 2060 may be directly set. In this case, the electric motor 2060 may be driven at the set operating voltage or with the set operating current.

The rotational speed of the electric motor 2060 is a rotational speed that corresponds to the torque generated by the electric motor 2060. The rotational speed of the electric motor 2060 is detected by the rotational speed sensor 5040, and a signal indicating the detected rotational speed is transmitted to the ECU 100.

The duty ratio is calculated by adding a basic duty ratio and a correction duty ratio together. The basic duty ratio and the correction duty ratio are set based on, for example, the target phase of the intake valve 1100, which is set using the map shown in FIG. 5, and the rotational speed and the phase of the intake camshaft 1120 (the phase of the intake valve 1100) that are detected using the cam position sensor 5010.

More specifically, a required value of the difference in the rotational speed (relative rotational speed) between the output shaft of the electric motor 2060 and the sprocket 2010 (hereinafter, referred to as "required rotational speed difference" where appropriate) is calculated based on a difference ΔCA between the target phase and the detected phase. The required rotational speed difference is calculated using a map that is prepared in advance using, for example, the difference ΔCA as a parameter. Note that, the method for calculating the required rotational speed difference is not limited to this.

In addition, a required value of the rotational speed of the output shaft of the electric motor 2060 (hereinafter, referred to as "required rotational speed" where appropriate) is calculated by adding the required rotational speed difference and the rotational speed of the intake camshaft 1120 together.

The basic duty ratio of the electric motor 2060 is calculated based on the required rotational speed. The basic duty ratio is calculated to be a higher value as the required rotational speed is higher. The basic duty ratio is calculated using a map that is prepared in advance using, for example, the required rotational speed as a parameter. Note that, the method for calculating the basic duty ratio is not limited to this.

The correction duty ratio is calculated based on a rotational speed difference ΔN between the rotational speed of the output shaft of the electric motor 2060, which is detected by the rotational speed sensor 5040, and the required rotational speed. The correction duty ratio is calculated to be a value obtained by multiplying the rotational speed difference ΔN by a correction coefficient K. Note that, the method for calculating the correction duty ratio is not limited to this.

Figure 14:
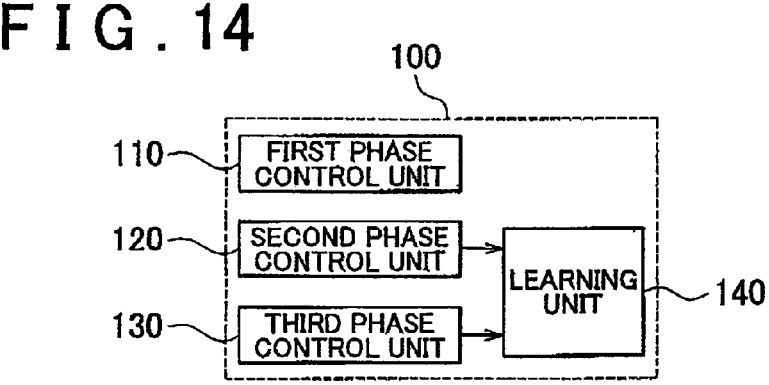
FIG. 14 is a functional block diagram of an ECU according to a first embodiment of the invention.

The function of the ECU 100 according to the first embodiment of the invention will be described with reference to FIG. 14. The function of the ECU 100, which will be described below, may be implemented by either hardware or software.

Figure 15:
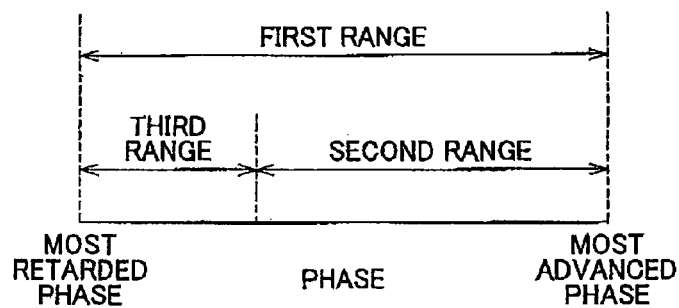
FIG. 15 is a graph showing the ranges in which the phase of the intake valve is allowed to change.

The ECU 100 includes a first phase control unit 110, a second phase control unit 120, a third phase control unit 130, and a learning unit 140. The first phase control unit 110 controls the intake VVT mechanism 2000 (electric motor 2060) so that, when the engine 1000 is operating (the fuel is injected and ignited, whereby the engine 1000 generates torque), the phase of the intake valve 1100 is changed within a second range that is included in a first range that extends from the most retarded phase to the most advanced phase as shown in FIG. 15. The second range does not include the most retarded phase.

In the first embodiment of the invention, a third range that includes the most retarded phase is used only when the engine 1000 is being started. This is because, the most retarded phase is set so that the phase of the intake valve 1100 is retarded by a large amount in order to reduce the vibration, which is likely to occur when the engine 1000 is being started, by reducing the compression ratio.

The second phase control unit 120 controls the intake VVT mechanism 2000 so that the phase of the intake valve 1100 is brought to the mechanically determined most retarded phase when a fuel-supply cutoff control is executed to stop fuel injection in the engine 1000. For example, the phase of the intake valve 1100 is brought to the most retarded phase by retarding the phase of the intake valve 1100 at a constant duty ratio until the amount of change in the phase, which is detected by the cam position sensor 5010, becomes "0". Note that, the method for bringing the phase of the intake valve 1100 to the most retarded phase is not limited to this.

The third phase control unit 130 controls the intake VVT mechanism 2000 so that the phase of the intake valve 1100 is brought to the mechanically determined most retarded phase when the hybrid vehicle travels in the second mode in which the engine 1000 is stopped and the hybrid vehicle travels using only the drive power generated by the second MG 400.

The learning unit 140 learns the value output from the cam position sensor 5010, that is, the phase detected by the cam position sensor 5010 in the state in which the intake VVT mechanism 2000 is controlled so that the phase of the intake valve 1100 is brought to the most retarded phase.

That is, the learning unit 140 learns the phase, which is detected by the cam position sensor 5010, as the most retarded phase when the fuel-supply cutoff control is executed, or when the hybrid vehicle travels using only the drive power generated by the second MG 400. For example, the initial value that is stored as the most retarded phase is replaced with the phase detected by the cam position sensor 5010. The learning unit 140 may learn the deviation of the detected phase from the initial value. Note that, the method for learning the phase of the intake valve 1100 is not limited to this.

Figure 16:
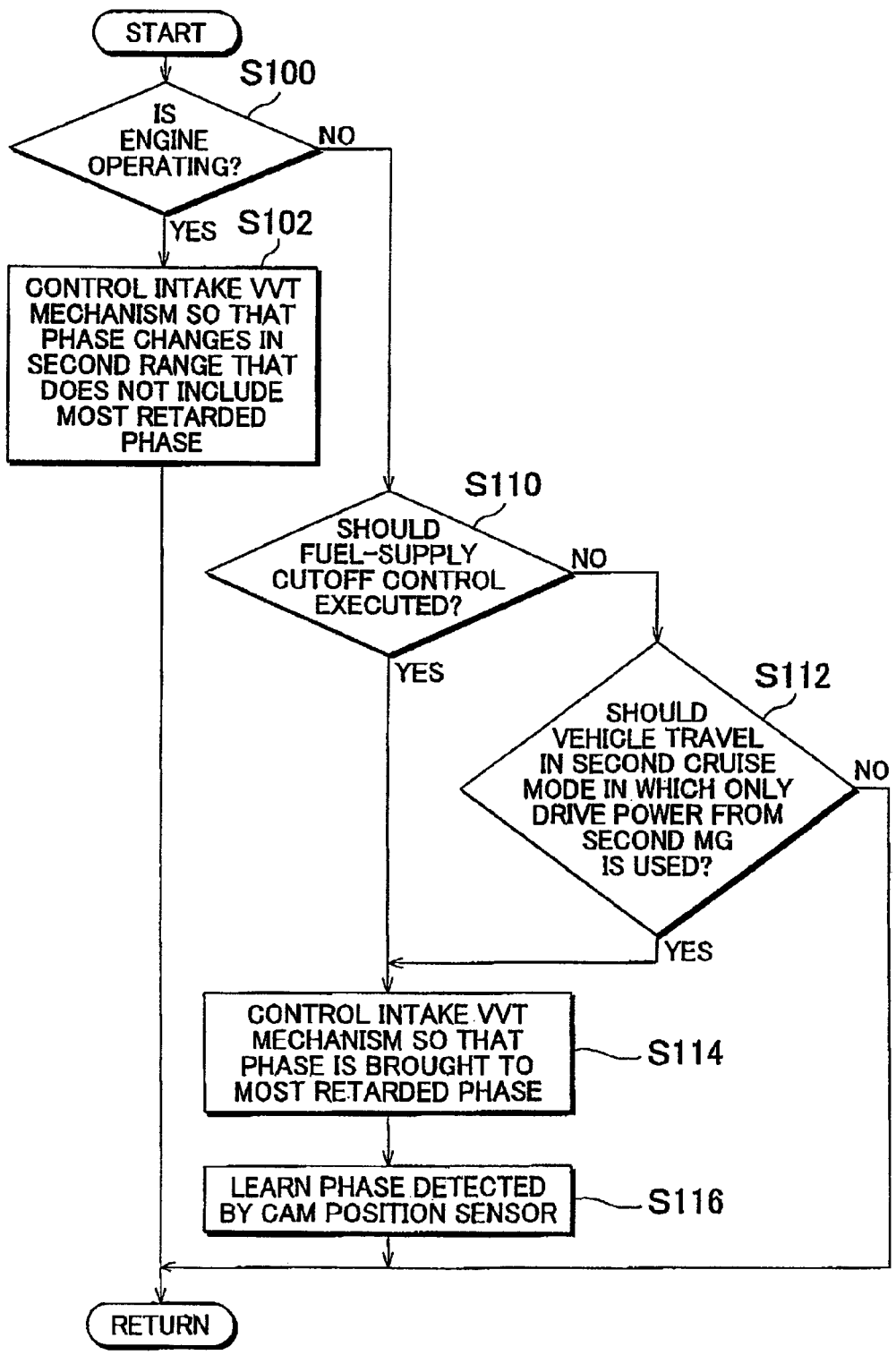
FIG. 16 is a flowchart showing a control routine of a program executed by the ECU.

A control routine of a program executed by the ECU 100, which is the control unit according to the first embodiment of the invention, will be described with reference to FIG. 16. The program described below is periodically executed at predetermined time intervals.

In step (hereinafter, referred to as "S") 100, the ECU 100 determines whether the engine 1000 is operating. If it is determined that the engine 1000 is operating ("YES" in S100), S102 is executed. On the other hand, if it is determined that the engine 1000 is stopped ("NO" in S100), S110 is executed.

In S102, the ECU 100 controls the intake VVT mechanism 2000 so that the phase changes in the second range that does not include the most retarded phase.

In S110, the ECU 100 determines whether the fuel-supply cutoff control should be executed. If it is determined that the fuel-supply cutoff control should be executed ("YES" in S110), S114 is executed. On the other hand, if it is determined that the fuel-supply cutoff control need not be executed ("NO" in S110), S112 is executed.

In S112, the ECU 100 determines whether the hybrid vehicle should travel in the second mode in which the engine 1000 is stopped and the hybrid vehicle travels using only the drive power generated by the second MG 400. If it is determined that the hybrid vehicle should travel in the second mode ("YES" in S112), S114 is executed. On the other hand, if it is determined that the hybrid vehicle need not travel in the second mode ("NO" in S112), the control routine ends.

In S114, the ECU 100 controls the intake VVT mechanism 2000 so that the phase of the intake valve 1100 is brought to the mechanically determined most retarded phase. In S116, the ECU 100 learns the phase, which is detected by the cam position sensor 5010, as the most retarded phase.

The ECU 100 has the above-described structure and executes the above-described control routine in the flowchart. The operation of the ECU 100, which is the control unit according to the first embodiment of the invention, will be described below.

The most retarded phase is set so that the phase of the intake valve 1100 is retarded by a large amount in order to reduce the vibration, which is likely to occur when the engine 1000 is being started, by reducing the compression ratio. Accordingly, if the phase of the intake valve 1100 is brought to the most retarded phase when the engine 1000 is operating, the phase is retarded more than necessary. In this case, for example, the exhaust emission may deteriorate. Also, shock may be caused due to a decrease in the drive power output from the engine 1000.

Therefore, if it is determined that the engine 1000 is operating ("YES" in S100), the intake VVT mechanism 2000 is controlled so that the phase of the intake valve 1100 is changed within the second range that does not include the most retarded phase (S102).

On the other hand, if it is determined that the fuel-supply cutoff control should be executed ("YES" in S110), or if it is determined that the hybrid vehicle should travel in the second mode in which the engine 1000 is stopped and the hybrid vehicle runs using only the drive power generated by the second MG 400 ("YES" in S112), that is, when the engine 1000 is stopped, fuel combustion does not take place in the engine 1000. In these cases, even if the phase of the intake valve 1100 is brought to the most retarded phase, the exhaust emission does not deteriorate or shock is not caused.

Therefore, the intake VVT mechanism 2000 is controlled so that the phase of the intake valve 1100 is brought to the mechanically determined most retarded phase (S114). The phase, which is detected by the cam position sensor 5010 in this state, is learned as the most retarded phase (S116). Thus, it is possible to learn the most retarded phase without causing shock or deterioration of the exhaust emission.

As described above, with the ECU which is the control unit according to the first embodiment of the invention, when the engine is operating, the intake VVT mechanism is controlled so that the phase of the intake valve is changed within the second range that does not include the most retarded phase. On the other hand, when the engine is stopped, the intake VVT mechanism is controlled so that the phase is brought to the most retarded phase. The phase detected by the cam position sensor in this state is learned. Thus, it is possible to learn the most retarded phase without causing shock or deterioration of the exhaust emission.

Note that, the phase, which is detected by the cam position sensor at the mechanically determined most retarded phase, may be learned.

Figure 17:
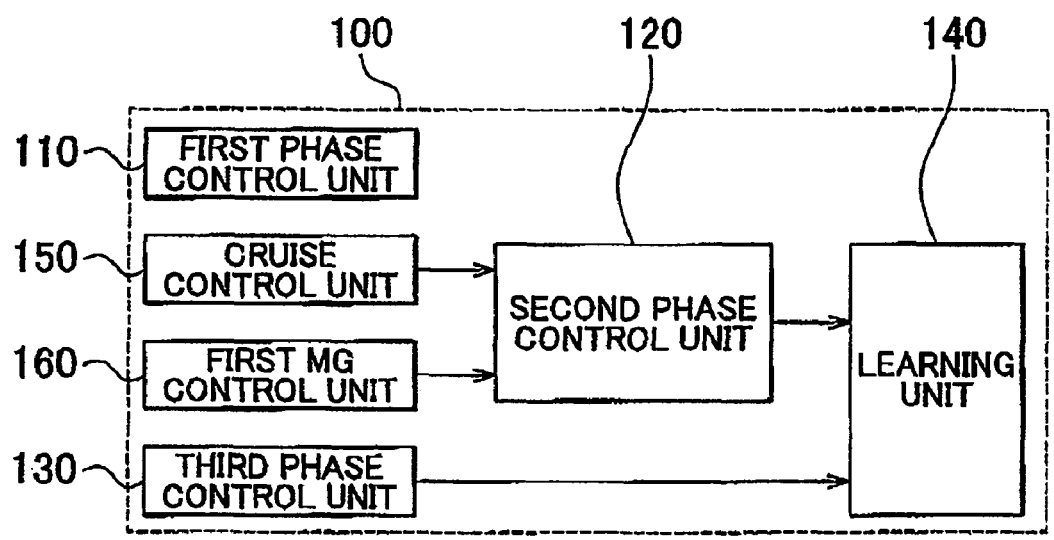
FIG. 17 is a functional block diagram of the ECU according to a second embodiment of the invention.

The function of the ECU 100 according to a second embodiment of the invention will be described with reference to FIG. 17. The function of the ECU 100, which will be described below, may be implemented by either hardware or software.

The ECU 100 includes the learning unit 140, a cruise control unit 150, a first MG control unit 160, the first phase control unit 110, the second phase control unit 120, and the third phase control unit 130.

The learning unit 140 learns the value output from the cam position sensor 5010, that is, the phase of the intake valve 1100 detected by the cam position sensor 5010 in the state in which the intake VVT mechanism 2000 is controlled so that the phase of the intake valve 1100 is brought to the mechanically determined most retarded phase.

For example, the initial value that is stored as the most retarded phase is replaced with the phase detected by the cam position sensor 5010. The learning unit 140 may learn the deviation of the detected phase from the initial value. Note that, the method for learning the phase of the intake valve 1100 is not limited to this.

The data that indicates the learned phase is recorded on a SRAM (Static Random Access Memory) 104 of the ECU 100 shown in FIG. 1. While electric power is supplied to the SRAM 104, the data that indicates the learned phase is maintained. Therefore, if a battery 106, that is a power source for the ECU 100, is removed or replaced with a new one, the data that indicates the learned phase is erased.

Referring again to FIG. 17, if the data that indicates the phase learned by the learning unit 140 is erased, the cruise control unit 150 executes a control so that the hybrid vehicle travels in the second mode in which the engine 1000 is stopped and the hybrid vehicle travels using only the drive power generated by the second MG 400. The state in which the engine 1000 is operating means the state in which the fuel is injected and ignited and therefore the engine 1000 generates torque.

When the hybrid vehicle travels in the second mode because the data that indicates the learned phase is erased, the first MG control unit 160 controls the first MG 200 so that the crankshaft 190 is rotated by the drive power generated by the first MG 200. The rotation of the crankshaft 1090 rotates the intake camshaft 1120 and the exhaust camshaft 1130.

When the engine 1000 is operating, the first phase control unit 110 controls the intake VVT mechanism 2000 (electric motor 2060) so that the phase of the intake valve 1100 changes within the second range that is included in the first range that extends from the most retarded phase to the most advanced phase as shown in FIG. 15. The second range does not include the most retarded phase.

In the second embodiment of the invention, the third range, which is included in the first range and which includes the most retarded phase, is used only when the engine 1000 is being started. This is because, the most retarded phase is set so that the phase of the intake valve 1100 is retarded by a large amount in order to reduce the vibration, which is likely to occur when the engine 1000 is being started, by reducing the compression ratio. Therefore, for example, when the engine 1000 is stopped, the intake VVT mechanism 2000 is controlled so that the phase is brought to the most retarded phase.

The second phase control unit 120 controls the intake VVT mechanism 2000 so that the phase of the intake valve 1100 is brought to the mechanically determined most retarded phase, when the first MG 200 is controlled so that the crankshaft 1090 rotates, namely, the camshafts 1120 and 1130 rotate while the hybrid vehicle travels in the second mode. For example, the phase of the intake valve 1100 is brought to the most retarded phase by retarding the phase of the intake valve 1100 at a constant duty ratio until the amount of change in the phase, which is detected by the cam position sensor 5010, becomes "0". Note that, the method for bringing the phase of the intake valve 1100 to the most retarded phase is not limited to this.

When the phase learning condition is satisfied, the third phase control unit 130 controls the intake VVT mechanism 2000 so that the phase of the intake valve 1100 is brought to the mechanically determined most retarded phase. The phase learning condition is, for example, a condition that the fuel-supply cutoff control for stopping fuel supply is being executed. Note that, the phase learning condition is not limited to this.

Figure 18:
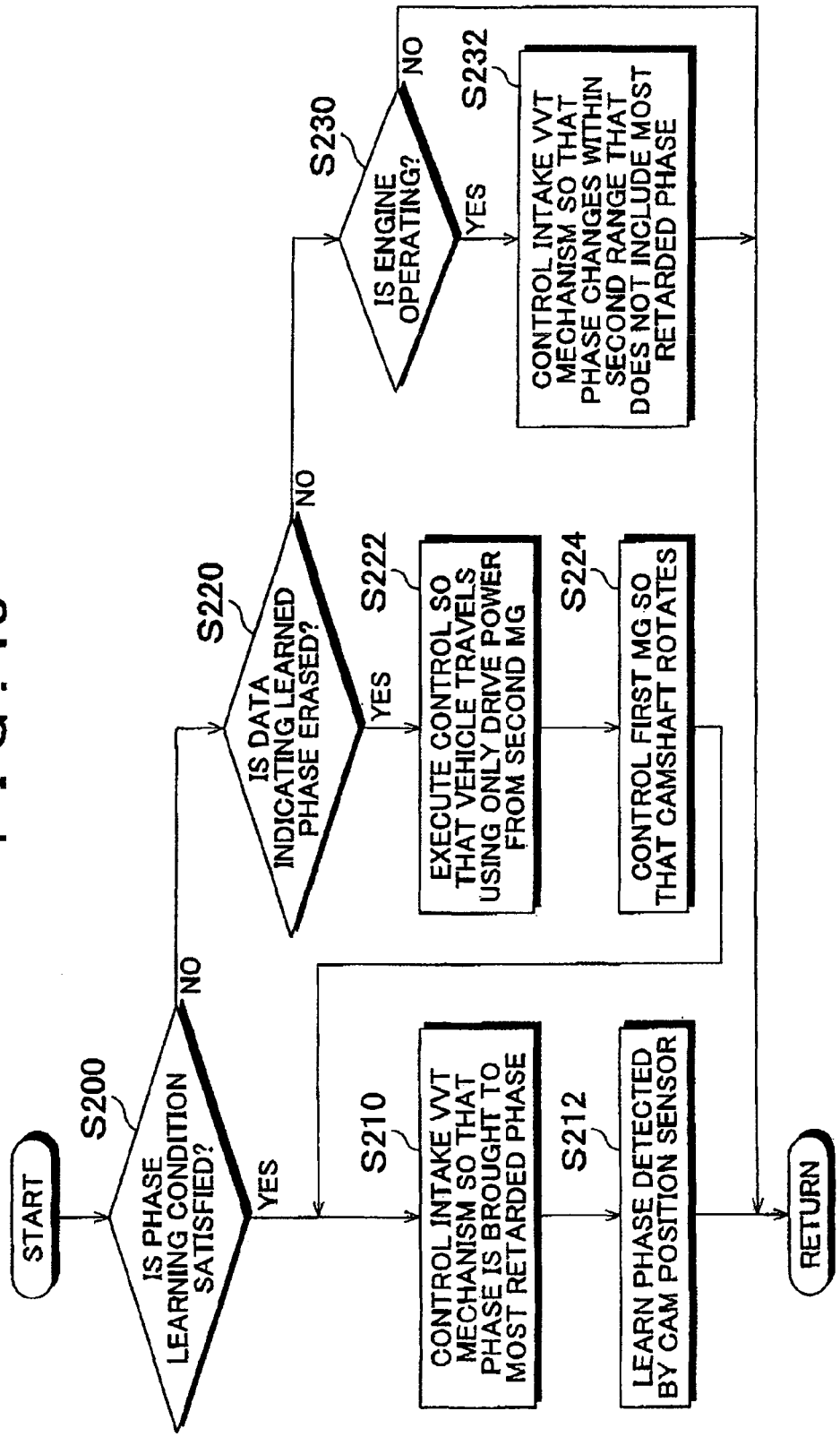
FIG. 18 is a flowchart showing a control routine of a program executed by the ECU according to the second embodiment of the invention.

A control routine of a program executed by the ECU 100, which is the control unit according to the second embodiment of the invention, will be described with reference to FIG. 18. The program described below is periodically executed at predetermined time intervals.

In step (hereinafter, referred to as "S") 200, the ECU 100 determines whether the phase learning condition is satisfied. If it is determined that the phase learning condition is satisfied ("YES" in S200), S210 is executed. If it is determined that the phase learning condition is not satisfied ("NO" in S200), S220 is executed.

In S210, the ECU 100 controls the intake VVT mechanism 2000 so that the phase of the intake valve 1100 is brought to the mechanically determined most retarded phase. In S212, the ECU 100 learns the phase detected by the cam position sensor 5010 as the most retarded phase.

In S220, the ECU 100 determines whether the data, which indicates the phase that is learned when the intake VVT mechanism 2000 is controlled so that the phase of the intake valve 1100 is brought to the mechanically determined most retarded phase, is erased. Because a known technology may be used to prepare the method for determining whether the data is erased, the detailed description thereof will not be provided below.

If it is determined that the data that indicates the learned phase is erased ("YES" in S220), 5222 is executed. On the other hand, if it is determined that the data that indicates the learned phase is not erased ("NO" in S220), S230 is executed.

In S222, the ECU 100 executes a control so that the hybrid vehicle travels in the second mode in which the engine 1000 is stopped and the hybrid vehicle travels using only the drive power that is generated by the second MG 400.

In S224, the ECU 100 controls the first MG 200 so that the crankshaft 1090 is rotated by the drive power generated by the first MG 200, that is, the camshafts 1120 and 1130 are rotated by the drive power generated by the first MG 200. After S224 is completed, S210 is executed.

In S230, the ECU 100 determines whether the engine 1000 is operating. If it is determined that the engine 1000 is operating ("YES" in S230), S232 is executed. On the other hand, if it is determined that the engine 1000 is stopped ("NO" in S230), the routine ends. In S232, the ECU 100 controls the intake VVT mechanism 2000 so that the phase of the intake valve 1100 changes in the second range that does not include the most retarded phase.

The ECU 100 has the above-described structure and executes the above-described control routine in the flowchart. The operation of the ECU 100, which is the control unit according to the second embodiment of the invention, will be described below.

When the phase learning condition is satisfied ("YES" in S200), the intake VVT mechanism 2000 is controlled so that the phase of the intake valve 1100 is brought to the mechanically determined most retarded phase (S210). The phase that is detected by the cam position sensor 5010 in this state is learned as the most retarded phase (S212).

If the data that indicates the learned phase is erased from the SRAM 104 because the battery 106 is removed or replaced with a new one, the accuracy of the phase of the intake valve 1100, which is controlled by the ECU 100, may deteriorate. If the engine 1000 is operated in this state, the actual phase may deviate from the target value of the phase which is used in the control. Therefore, the output from the engine 1000 or the exhaust emission may deteriorate.

Therefore, if the data that indicates the learned phase is erased ("YES" in S220), a control is executed so that the hybrid vehicle travels in the second mode in which the engine 1000 is stopped and the hybrid vehicle travels using only the drive power generated by the second MG 400 (S222).

In addition, the first MG 200 is controlled so that the crankshaft 1090 is rotated by the drive power generated by the first MG 200, that is, the camshafts 1120 and 1130 are rotated by the drive power generated by the first MG 200 (S224). Thus, it is possible to reduce a resistance of the intake camshaft 1120 that is generated when the phase is changed by rotating the intake camshaft 1120 with respect to the sprocket 2010.

Therefore, the intake VVT mechanism 2000 is controlled so that the phase of the intake valve 1100 is brought to the mechanically determined most retarded phase (S210). Thus, the phase of the intake valve 1100 is reliably brought to the most retarded phase. The phase that is detected by the cam position sensor 5010 at this time is learned as the most retarded phase (S212). Therefore, it is possible to accurately learn the phase of the intake valve 1100 while the hybrid vehicle is traveling.

The most retarded phase is set so that the phase of the intake valve 1100 is retarded by a large amount in order to reduce the vibration, which is likely to occur when the engine 1000 is being started, by reducing the compression ratio. Accordingly, if the phase of the intake valve 1100 is brought to the most retarded phase when the engine 1000 is operating, the phase is retarded more than necessary. In this case, for example, the exhaust emission may deteriorate. Also, shock may be caused due to a decrease in the drive power output from the engine 1000.

Therefore, if it is determined that the data that indicates the learned phase is not erased from the SRAM 104 ("NO" in S220), and it is determined that the engine 1000 is operating ("YES" in S230), the intake VVT mechanism 2000 is controlled so that the phase of the intake valve 1100 changes within the second range that does not include the most retarded phase (S232). Thus, it is possible to avoid the situation in which the phase is retarded more than necessary when the engine 1000 is operating.

With the ECU, which is the control unit according to the second embodiment of the invention, a control is executed so that the hybrid vehicle travels in the second mode in which the engine is stopped and the hybrid vehicle travels using only the power generated by the second MG. The first MG is controlled so that the camshaft is rotated by the drive power generated by the first MG when the hybrid vehicle is traveling in the second mode. Thus, a rotational resistance of the camshaft, which is generated when the phase is changed, is reduced more effectively than when the camshaft is stopped. The intake VVT mechanism is controlled so that the phase of the intake valve 1100 is brought to the most retarded phase when the first MG is controlled so that the camshaft rotates. Therefore, It is possible to reliably change the phase of the intake valve 1100 to the most retarded phase. The phase, which is detected by the cam position sensor when the intake VVT mechanism is controlled so that the phase of the intake valve 1100 is brought to the mechanically determined most retarded phase, is learned. As a result, it is possible to accurately learn the phase of the intake valve 1100 while the hybrid vehicle is traveling.

The phase that is detected by the cam position sensor at the mechanically determined most retarded phase may be learned. Note that, the phase of the exhaust valve 1110 may be learned.

The embodiments of the invention that have been described in the specification are to be considered in all respects as illustrative and not restrictive. The technical scope of the invention is defined by claims, and all changes which come within the meaning and range of equivalency of the claims are therefore intended to be embraced therein.

The invention claimed is:

1. An electronic control unit for a variable valve timing mechanism of a hybrid drive vehicle system that changes a valve phase of at least one of an intake valve and an exhaust valve within a first range from a first phase that is a most retarded phase to a second phase that is a most advanced phase by changing a phase of a camshaft with respect to an output shaft of an internal combustion engine, comprising:
   a detector that detects the valve phase;
   a first phase control unit that executes a control of the variable valve timing mechanism, including an electric actuator, for bringing the valve phase to the first phase, when the internal combustion engine is stopped while the vehicle is travelling due to drive power from a drive power source that differs from the internal combustion engine; and
a learning unit that learns the valve phase detected by the detector, when the valve phase is controlled to the first phase.

2. The electronic control unit according to claim 1, wherein the first phase control unit executes the control for bringing the valve phase to the first phase, when fuel injection is stopped in the internal combustion engine.

3. The electronic control unit according to claim 1, wherein:
the internal combustion engine is mountable in a vehicle that travels in a cruise mode selected from among a first mode in which the vehicle travels using drive power generated by the internal combustion engine and a second mode in which the vehicle travels using drive power generated by the drive power source that differs from the internal combustion engine; and
the first phase control unit executes the control for bringing the valve phase to the first phase, when the vehicle travels in the second mode.

4. An electronic control unit for a variable valve timing mechanism that changes a valve phase of at least one of an intake valve and an exhaust valve within a first range from a first phase that is a most retarded phase to a second phase that is a most advanced phase by changing a phase of a camshaft with respect to an output shaft of an internal combustion engine, comprising:
a detector that detects the valve phase;
a first phase control unit that executes a control for bringing the valve phase to the first phase, when the internal combustion engine is stopped;
a learning unit that learns the valve phase detected by the detector, when the valve phase is controlled to the first phase; and
a second phase control unit that executes a control for changing the valve phase within a second range that does not include the first phase, when the internal combustion engine is operating.

5. The electronic control unit according to claim 4, wherein the first phase control unit executes the control for bringing the valve phase to the first phase, when fuel injection is stopped in the internal combustion engine.

6. The electronic control unit according to claim 4, wherein:
the internal combustion engine is mountable in a vehicle that travels in a cruise mode selected from among a first mode in which the vehicle travels using drive power generated by the internal combustion engine and a second mode in which the vehicle travels using drive power generated by a drive power source that differs from the internal combustion engine; and
the first phase control unit executes the control for bringing the valve phase to the first phase, when the vehicle travels in the second mode.

7. A control apparatus of a vehicle including an internal combustion engine and a drive power source that differs from the internal combustion engine, wherein the internal combustion engine includes an electronic control unit for a variable valve timing mechanism that changes a valve phase of at least one of an intake valve and an exhaust valve within a first range from a first phase that is a most retarded phase to a second phase that is a most advanced phase by changing a phase of a camshaft with respect to an output shaft of an internal combustion engine, wherein the control apparatus comprises:
a detector that detects the valve phase;
a first phase control unit that executes a control for bringing the valve phase to the first phase, when the internal combustion engine is stopped;
a learning unit that learns the valve phase detected by the detector, when the valve phase is controlled to the first phase;
a second phase control unit that executes a control so that the vehicle travels using drive power generated by the drive power source without operating the internal combustion engine; and
a third phase control unit that executes a control so that a camshaft is rotated by drive power generated by a rotary electric machine, when the vehicle travels using the drive power generated by the drive power source without operating the internal combustion engine, wherein the first phase control unit executes the control for bringing the valve phase to the first phase, when the camshaft is rotated by the drive power generated by the rotary electric machine.

8. The control apparatus according to claim 7, wherein the second phase control unit executes the control so that the vehicle travels using the drive power generated by the drive power source without operating the internal combustion engine, when data that indicates the learned phase is erased.

9. The control apparatus according to claim 7, further comprising:
a fourth phase control unit that executes a control so that the valve phase changes within a range that does not include the first phase, when the internal combustion engine is operating.

10. The control apparatus according to claim 7, wherein the second phase control unit executes the control so that the vehicle travels using the drive power generated by the drive power source, when a predetermined learning condition is satisfied.

11. The control apparatus according to claim 10, wherein the predetermined learning condition includes a condition that a fuel-supply cutoff control is being executed over the internal combustion engine.

12. A control method for a variable valve timing mechanism of a hybrid drive vehicle system that changes a valve phase of at least one of an intake valve and an exhaust valve within a first range from a first phase that is a most retarded phase to a second phase that is a most advanced phase by changing a phase of a camshaft with respect to an output shaft of an internal combustion engine, comprising:
detecting the valve phase;
executing a control of the variable valve timing mechanism, including an electric actuator, for bringing the valve phase to the first phase, when the internal combustion engine is stopped while the vehicle is travelling due to drive power from a drive power source that differs from the internal combustion engine; and
learning the valve phase that is detected when the valve phase is controlled to the first phase.

13. A computer-readable recording medium on which a computer executable program based on which a computer implements the control method according to claim 12 is recorded.

14. The control method according to claim 12, wherein:
when the internal combustion engine is mounted in a vehicle that travels in a cruise mode selected from among a first mode in which the vehicle travels using drive power generated by the internal combustion engine and a second mode in which the vehicle travels using drive power generated by a drive power source that differs from the internal combustion engine, further comprising:

executing the control for bringing the valve phase to the first phase, when the vehicle travels in the second mode.

15. A control method for a variable valve timing mechanism that changes a valve phase of at least one of an intake valve and an exhaust valve within a first range from a first phase that is a most retarded phase to a second phase that is a most advanced phase by changing a phase of a camshaft with respect to an output shaft of an internal combustion engine, comprising:

detecting the valve phase;

executing a control for bringing the valve phase to the first phase, when the internal combustion engine is stopped;

learning the valve phase that is detected when the valve phase is controlled to the first phase; and executing a control for changing the valve phase within a second range that does not include the first phase, when the internal combustion engine is operating.

16. The control method according to claim 15, wherein the control for bringing the valve phase to the first phase is executed, when fuel injection is stopped in the internal combustion engine.

17. The control method according to claim 15, wherein:

when the internal combustion engine is mounted in a vehicle that travels in a cruise mode selected from among a first mode in which the vehicle travels using drive power generated by the internal combustion engine and a second mode in which the vehicle travels using drive power generated by a drive power source that differs from the internal combustion engine, further comprising:

executing the control for bringing the valve phase to the first phase, when the vehicle travels in the second mode.

18. A computer-readable recording medium on which a computer executable program based on which a computer implements the control method according to claim 15 is recorded.

19. A control method for a vehicle including an internal combustion engine and a drive power source that differs from the internal combustion engine, wherein the internal combustion engine includes a variable valve timing mechanism that changes a valve phase of at least one of an intake valve and an exhaust valve within a first range from a first phase that is a most retarded phase to a second phase that is a most advanced phase by changing a phase of a camshaft with respect to an output shaft of an internal combustion engine, wherein the control method comprises:

detecting the valve phase;

executing a first control for bringing the valve phase to the first phase, when the internal combustion engine is stopped;

learning the valve phase that is detected when the valve phase is controlled to the first phase;

executing a second control so that the vehicle travels using drive power generated by the drive power source without operating the internal combustion engine;

executing a third control so that the camshaft is rotated by drive power generated by a rotary electric machine, when the vehicle travels using the drive power generated by the drive power source without operating the internal combustion engine; and executing the first control for bringing the valve phase to the first phase, when the camshaft is rotated by the drive power generated by the rotary electric machine.

20. The control method according to claim 19, wherein the second control is executed so that the vehicle travels using the drive power generated by the drive power source without operating the internal combustion engine, when data that indicates the learned phase is erased.

21. The control method according to claim 20, wherein the second control is executed so that the vehicle travels using the drive power generated by the drive power source, when a predetermined learning condition is satisfied.

22. The control method according to claim 21, wherein the predetermined learning condition includes a condition that a fuel-supply cutoff control is being executed over the internal combustion engine.

23. The control method according to claim 19, further comprising:

executing a fourth control so that the valve phase changes within a range that does not include the first phase, when the internal combustion engine is operating.

24. A computer-readable recording medium on which a computer executable program based on which a computer implements the control method according to claim 19 is recorded.

* * * * *